United States Patent
Bonk et al.

(10) Patent No.: US 9,582,792 B2
(45) Date of Patent: Feb. 28, 2017

(54) SYSTEM AND METHOD TO PURCHASE AND DISPENSE FUEL AND OTHER PRODUCTS USING A MOBILE DEVICE WITH IMPROVED USER EXPERIENCE

(71) Applicants: Rodney A. Bonk, Markham (CA);
Devin F. Miller, Moncton (CA);
Bryant Russell, Ashburn, VA (US);
Stephen P. Bown, Esher (GB)

(72) Inventors: Rodney A. Bonk, Markham (CA);
Devin F. Miller, Moncton (CA);
Bryant Russell, Ashburn, VA (US);
Stephen P. Bown, Esher (GB)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 14/341,995

(22) Filed: Jul. 28, 2014

(65) Prior Publication Data
US 2015/0032558 A1    Jan. 29, 2015

Related U.S. Application Data

(60) Provisional application No. 61/859,676, filed on Jul. 29, 2013.

(51) Int. Cl.
*G06Q 20/20*    (2012.01)
*G06Q 20/38*    (2012.01)
(Continued)

(52) U.S. Cl.
CPC ....... *G06Q 20/202* (2013.01); *G06Q 20/3224* (2013.01); *G06Q 20/382* (2013.01); *G06Q 50/06* (2013.01); *G07F 13/02* (2013.01)

(58) Field of Classification Search
CPC ...... G06Q 20/202; G06Q 20/20; G06Q 30/06;
G06Q 30/02; G07G 1/14
(Continued)

(56) References Cited

U.S. PATENT DOCUMENTS

| | | |
|---|---|---|
| 5,204,819 A | 4/1993 | Ryan |
| 6,073,840 A | 6/2000 | Marion |

(Continued)

FOREIGN PATENT DOCUMENTS

| | | |
|---|---|---|
| CA | 2546911 A1 | 11/2007 |
| CA | 2621531 A1 | 8/2008 |

(Continued)

OTHER PUBLICATIONS

Kirsner, "With new mobile payment app, Cumberland Farms allows customers to buy gas with their phones", Boston.com, Mar. 30, 2012, http://www.boston.com/business/technology/innoeco/2012/03/with_new_mobile_payment_app_cu.html.

(Continued)

*Primary Examiner* — Garcia Ade
(74) *Attorney, Agent, or Firm* — Robert A. Migliorini; David M. Weisberg

(57) ABSTRACT

The system to facilitate purchase and dispense fuel from a dispensing site using a mobile device employs a site connector computer that administers a site database and provides a secure connection to the point-of-sale system. The site database stores site-specific information about the dispensing site including the site location and pump identifying information from which the number of pumps at the dispensing site may be ascertained. A mobile app server communicates with the mobile device and issues queries to the site database to obtain the pump identifying information. The mobile app server communicates the pump identifying information to the mobile device for use in making a pump (Continued)

selection. After pump selection by the user, the mobile app server issues a fuel purchase instruction that includes the pump selection identifier to a financial processing computer network.

10 Claims, 18 Drawing Sheets

(51) Int. Cl.
    *G06Q 50/06*    (2012.01)
    *G06Q 20/32*    (2012.01)
    *G07F 13/02*    (2006.01)
    *G06Q 40/00*    (2012.01)

(58) Field of Classification Search
    USPC .......................................................... 705/21
    See application file for complete search history.

(56) References Cited

U.S. PATENT DOCUMENTS

| | | | |
|---|---|---|---|
| 6,360,141 B1 | 3/2002 | Jensen | |
| 6,535,726 B1 | 3/2003 | Johnson | |
| 6,571,201 B1 | 5/2003 | Royal, Jr. et al. | |
| 6,629,642 B1 | 10/2003 | Swartz et al. | |
| 6,757,585 B2 | 6/2004 | Ohtsuki et al. | |
| 6,763,094 B2 | 7/2004 | Conn et al. | |
| 6,764,003 B1 | 7/2004 | Martschitsch et al. | |
| 7,039,389 B2 | 5/2006 | Johnson, Jr. | |
| 7,054,830 B1 | 5/2006 | Eggleston et al. | |
| 7,055,737 B1 | 6/2006 | Tobin et al. | |
| 7,085,556 B2 | 8/2006 | Offer | |
| 7,337,968 B2 | 3/2008 | Wilz, Sr. et al. | |
| RE40,220 E | 4/2008 | Nichols et al. | |
| 7,379,920 B2 | 5/2008 | Leung et al. | |
| 7,431,207 B1 | 10/2008 | Neemann et al. | |
| 7,461,010 B2 | 12/2008 | Kwan | |
| 7,469,826 B2 | 12/2008 | Ciancio et al. | |
| 7,574,377 B2 | 8/2009 | Carapelli | |
| 7,627,531 B2 | 12/2009 | Breck et al. | |
| 7,665,660 B2 | 2/2010 | Degliantoni et al. | |
| 7,716,082 B1 | 5/2010 | Blalock | |
| 7,774,231 B2 | 8/2010 | Pond et al. | |
| 7,793,829 B2 | 9/2010 | Randazza et al. | |
| 7,814,015 B2 | 10/2010 | Benedyk et al. | |
| 7,828,206 B2 | 11/2010 | Hessburg et al. | |
| 7,831,520 B2 | 11/2010 | Mengerink | |
| 7,840,496 B2 | 11/2010 | Vallee et al. | |
| 7,874,482 B2 | 1/2011 | Mitschele | |
| 7,988,040 B2 | 8/2011 | Randazza et al. | |
| 8,032,414 B2 | 10/2011 | Payne et al. | |
| 8,123,125 B2 | 2/2012 | Ciancio et al. | |
| 8,160,546 B2 | 4/2012 | Timmons | |
| 8,205,791 B2 | 6/2012 | Randazza et al. | |
| 8,261,978 B2 | 9/2012 | Gangi | |
| 8,332,272 B2 | 12/2012 | Fisher | |
| 8,393,536 B2 | 3/2013 | Randazza et al. | |
| 8,424,752 B2 | 4/2013 | Rothschild | |
| 8,489,067 B2 | 7/2013 | Rackley, III et al. | |
| 8,490,865 B2 | 7/2013 | Randazza et al. | |
| 8,651,369 B2 | 2/2014 | Rothschild | |
| 8,662,384 B2 | 3/2014 | Dodin | |
| 8,688,147 B2 | 4/2014 | Nguyen et al. | |
| 8,701,986 B2 | 4/2014 | Randazza et al. | |
| 8,805,738 B2 | 8/2014 | Nethery, III | |
| 8,833,644 B2 | 9/2014 | Randazza et al. | |
| 8,936,190 B2 | 1/2015 | Rothschild | |
| 2001/0027422 A1 | 10/2001 | Brandrud | |
| 2002/0198625 A1 | 12/2002 | Paashuis | |
| 2003/0025600 A1 | 2/2003 | Blanchard | |
| 2003/0078895 A1 | 4/2003 | MacKay | |
| 2004/0054592 A1 | 3/2004 | Hernblad | |
| 2004/0117262 A1 | 6/2004 | Berger et al. | |
| 2004/0210486 A1 | 10/2004 | Carapelli | |
| 2005/0102233 A1 | 5/2005 | Park et al. | |
| 2007/0174082 A1 | 7/2007 | Singh | |
| 2007/0266130 A1 | 11/2007 | Mazur et al. | |
| 2008/0011837 A1 | 1/2008 | Wesley | |
| 2008/0017721 A1 | 1/2008 | Zehnacker | |
| 2008/0126208 A1* | 5/2008 | Nicholson | B67D 7/14 705/14.34 |
| 2008/0126251 A1 | 5/2008 | Wassingbo | |
| 2008/0154715 A1 | 6/2008 | Galinos | |
| 2008/0195498 A1 | 8/2008 | Crawford et al. | |
| 2008/0208701 A1 | 8/2008 | Betancourt et al. | |
| 2008/0235105 A1 | 9/2008 | Payne et al. | |
| 2008/0255942 A1 | 10/2008 | Craft | |
| 2008/0262936 A1 | 10/2008 | Paardekooper et al. | |
| 2008/0313028 A1 | 12/2008 | Williams et al. | |
| 2008/0313062 A1 | 12/2008 | Williams et al. | |
| 2008/0313078 A1* | 12/2008 | Payne | G06Q 20/40 705/44 |
| 2009/0106160 A1 | 4/2009 | Skowronek | |
| 2009/0259590 A1 | 10/2009 | Carapelli | |
| 2010/0088127 A1 | 4/2010 | Betancourt et al. | |
| 2010/0094752 A1 | 4/2010 | Heath | |
| 2010/0114688 A1 | 5/2010 | Song et al. | |
| 2010/0131347 A1 | 5/2010 | Sartipi | |
| 2010/0174598 A1 | 7/2010 | Khan et al. | |
| 2010/0222026 A1 | 9/2010 | Dragt | |
| 2010/0222088 A1 | 9/2010 | Dragt | |
| 2010/0222088 A1 | 9/2010 | Dragt | |
| 2010/0223145 A1 | 9/2010 | Dragt | |
| 2010/0280956 A1 | 11/2010 | Chutorash et al. | |
| 2011/0060629 A1 | 3/2011 | Yoder et al. | |
| 2011/0145049 A1 | 6/2011 | Hertel et al. | |
| 2011/0153495 A1 | 6/2011 | Dixon et al. | |
| 2011/0173061 A1 | 7/2011 | Anulewicz et al. | |
| 2011/0184823 A1 | 7/2011 | Phillips | |
| 2011/0196782 A1 | 8/2011 | Allen et al. | |
| 2011/0218880 A1 | 9/2011 | Hammad et al. | |
| 2011/0270652 A1 | 11/2011 | McAleese et al. | |
| 2011/0282725 A1 | 11/2011 | Chatterjee et al. | |
| 2011/0288906 A1 | 11/2011 | Thomas et al. | |
| 2011/0307318 A1 | 12/2011 | Laporte et al. | |
| 2012/0010931 A1 | 1/2012 | Mehra et al. | |
| 2012/0016731 A1 | 1/2012 | Smith et al. | |
| 2012/0022956 A1 | 1/2012 | Payne et al. | |
| 2012/0029691 A1 | 2/2012 | Mockus et al. | |
| 2012/0041808 A1 | 2/2012 | Hofer et al. | |
| 2012/0130891 A1 | 5/2012 | Bogaard et al. | |
| 2012/0136780 A1 | 5/2012 | El-Awady et al. | |
| 2012/0136781 A1 | 5/2012 | Fridman et al. | |
| 2012/0173061 A1 | 7/2012 | Hanley et al. | |
| 2012/0185317 A1 | 7/2012 | Wong | |
| 2012/0191600 A1 | 7/2012 | Boot | |
| 2012/0197691 A1 | 8/2012 | Grigg et al. | |
| 2012/0209749 A1 | 8/2012 | Hammad et al. | |
| 2012/0218122 A1 | 8/2012 | Bogaard | |
| 2012/0245986 A1 | 9/2012 | Regan et al. | |
| 2012/0253913 A1 | 10/2012 | Richard | |
| 2012/0254965 A1 | 10/2012 | Parker | |
| 2012/0267432 A1* | 10/2012 | Kuttuva | G06Q 20/223 235/379 |
| 2012/0285790 A1 | 11/2012 | Jones et al. | |
| 2012/0290421 A1 | 11/2012 | Qawami et al. | |
| 2012/0296720 A1 | 11/2012 | Pirillo | |
| 2012/0296725 A1 | 11/2012 | Dessert et al. | |
| 2012/0310408 A1 | 12/2012 | Stache et al. | |
| 2012/0310713 A1 | 12/2012 | Mercuri et al. | |
| 2012/0323667 A1 | 12/2012 | Groff et al. | |
| 2012/0330787 A1 | 12/2012 | Hanson et al. | |
| 2012/0331301 A1 | 12/2012 | Outwater et al. | |
| 2013/0006776 A1 | 1/2013 | Miller et al. | |
| 2013/0032635 A1 | 2/2013 | Grinvald | |
| 2013/0046599 A1 | 2/2013 | Coppinger | |
| 2013/0046604 A1 | 2/2013 | Jones et al. | |
| 2013/0054320 A1 | 2/2013 | Dorso et al. | |
| 2013/0054336 A1 | 2/2013 | Graylin | |
| 2013/0080236 A1 | 3/2013 | Royyuru et al. | |
| 2013/0097031 A1 | 4/2013 | Royyuru et al. | |
| 2013/0103483 A1 | 4/2013 | Xue | |
| 2013/0110717 A1 | 5/2013 | Kobres | |
| 2013/0124412 A1 | 5/2013 | Itwaru | |

(56) References Cited

U.S. PATENT DOCUMENTS

| | | |
|---|---|---|
| 2013/0124413 A1 | 5/2013 | Itwaru |
| 2013/0126607 A1 | 5/2013 | Behjat |
| 2013/0132234 A1 | 5/2013 | Grossi et al. |
| 2013/0144663 A1 | 6/2013 | Qawami et al. |
| 2013/0144702 A1 | 6/2013 | Tabor et al. |
| 2013/0159086 A1 | 6/2013 | Richard |
| 2013/0197992 A1 | 8/2013 | Bao |
| 2013/0246171 A1 | 9/2013 | Carapelli |
| 2014/0025521 A1 | 1/2014 | Alsina et al. |
| 2014/0074723 A1 | 3/2014 | Kamat |
| 2014/0114855 A1 | 4/2014 | Bajaj et al. |
| 2014/0143139 A1 | 5/2014 | Koplovitz et al. |
| 2014/0222677 A1 | 8/2014 | Karantzis |
| 2014/0244409 A1 | 8/2014 | Nathanel et al. |
| 2014/0244506 A1 | 8/2014 | Gramling |
| 2014/0297440 A1 | 10/2014 | Fredell et al. |

FOREIGN PATENT DOCUMENTS

| | | |
|---|---|---|
| CA | 2820983 A1 | 11/2009 |
| EP | 0511463 B1 | 8/1999 |
| EP | 1168257 A1 | 1/2002 |
| EP | 1316075 B1 | 5/2004 |
| EP | 1316179 B1 | 4/2005 |
| EP | 1543456 B1 | 8/2007 |
| EP | 0960402 B1 | 9/2007 |
| EP | 2509037 A1 | 10/2012 |
| EP | 02575096 A1 | 4/2013 |
| EP | 2733658 A1 | 5/2014 |
| WO | 2005086593 A3 | 9/2005 |
| WO | 2007059004 A1 | 5/2007 |
| WO | 2007100863 A3 | 9/2007 |
| WO | 2009051503 A3 | 4/2009 |
| WO | 2009126452 A2 | 10/2009 |
| WO | 2011154844 A2 | 12/2011 |
| WO | 2012089199 A1 | 7/2012 |
| WO | 2012151660 A1 | 11/2012 |
| WO | 2012163646 A1 | 12/2012 |
| WO | 2012172502 A1 | 12/2012 |
| WO | 2013003582 A1 | 1/2013 |
| WO | 2013040169 A1 | 3/2013 |
| WO | 2013063612 A1 | 5/2013 |
| WO | 2013074859 A1 | 5/2013 |
| WO | 2013074998 A1 | 5/2013 |
| WO | 2013126913 A1 | 8/2013 |
| WO | 2013153378 A1 | 10/2013 |
| WO | 2014037573 A1 | 3/2014 |
| WO | 2014037923 A1 | 3/2014 |
| WO | 2014058719 A2 | 4/2014 |
| WO | 2014122558 A1 | 8/2014 |

OTHER PUBLICATIONS

"AJB Launches Mobile Payments for Petroleum & C-Stores at Hughes", Businesswire, Mar. 18, 2013, URL: http://www.businesswire.com/news/home/20130318005156/en/AJB-Launches-Mobile-Payments-Petroleum-C-Stores-Hughes.
International Search Report and Written Opinion from PCT/US2014/048365 dated Oct. 20, 2014.

* cited by examiner

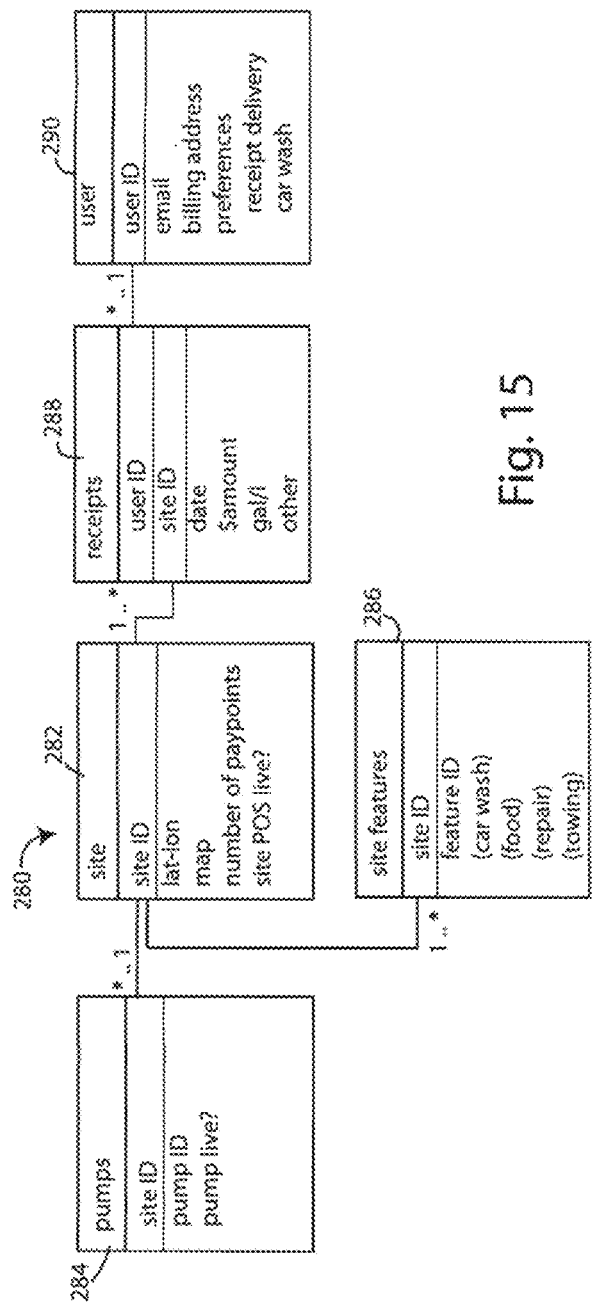
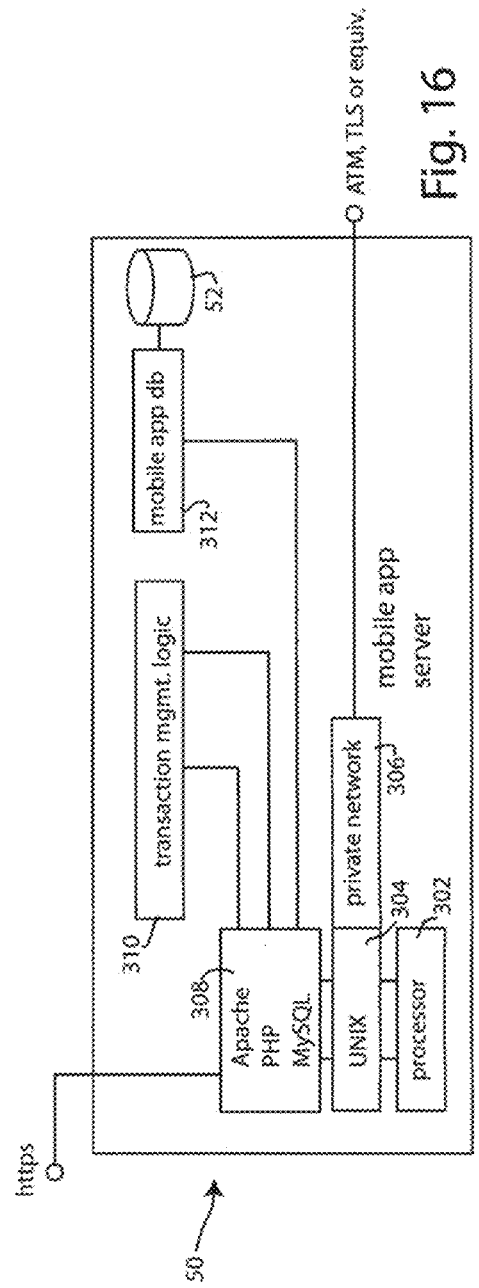

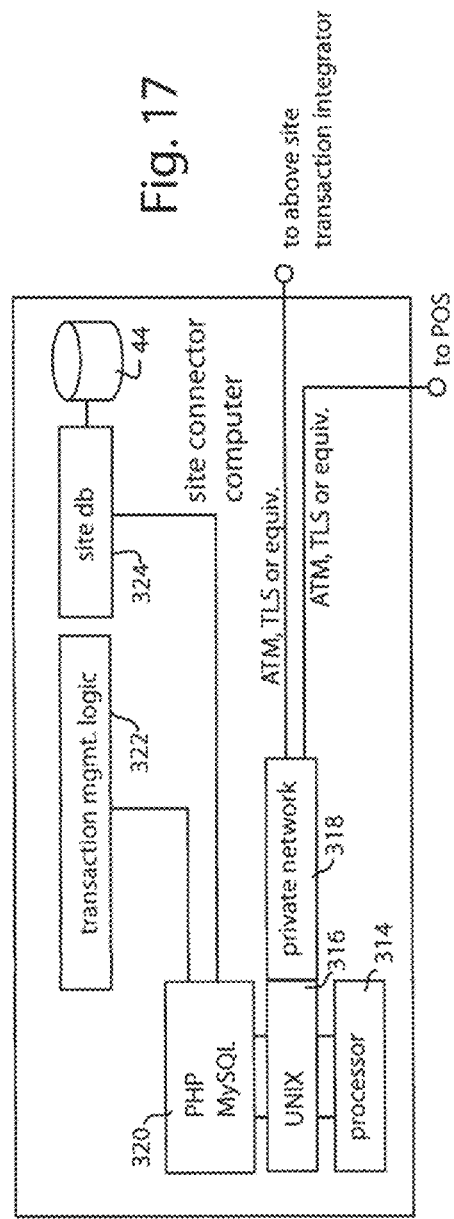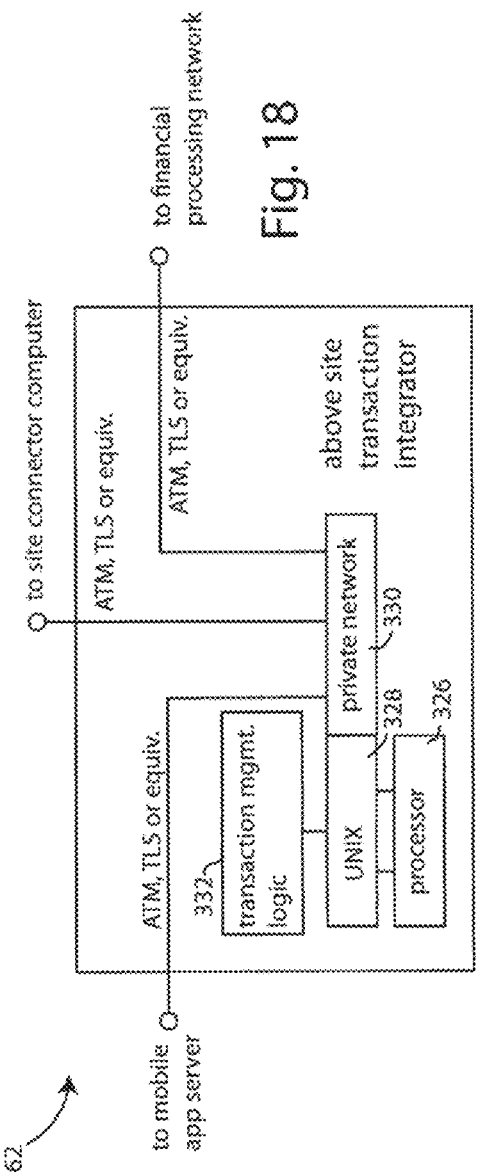

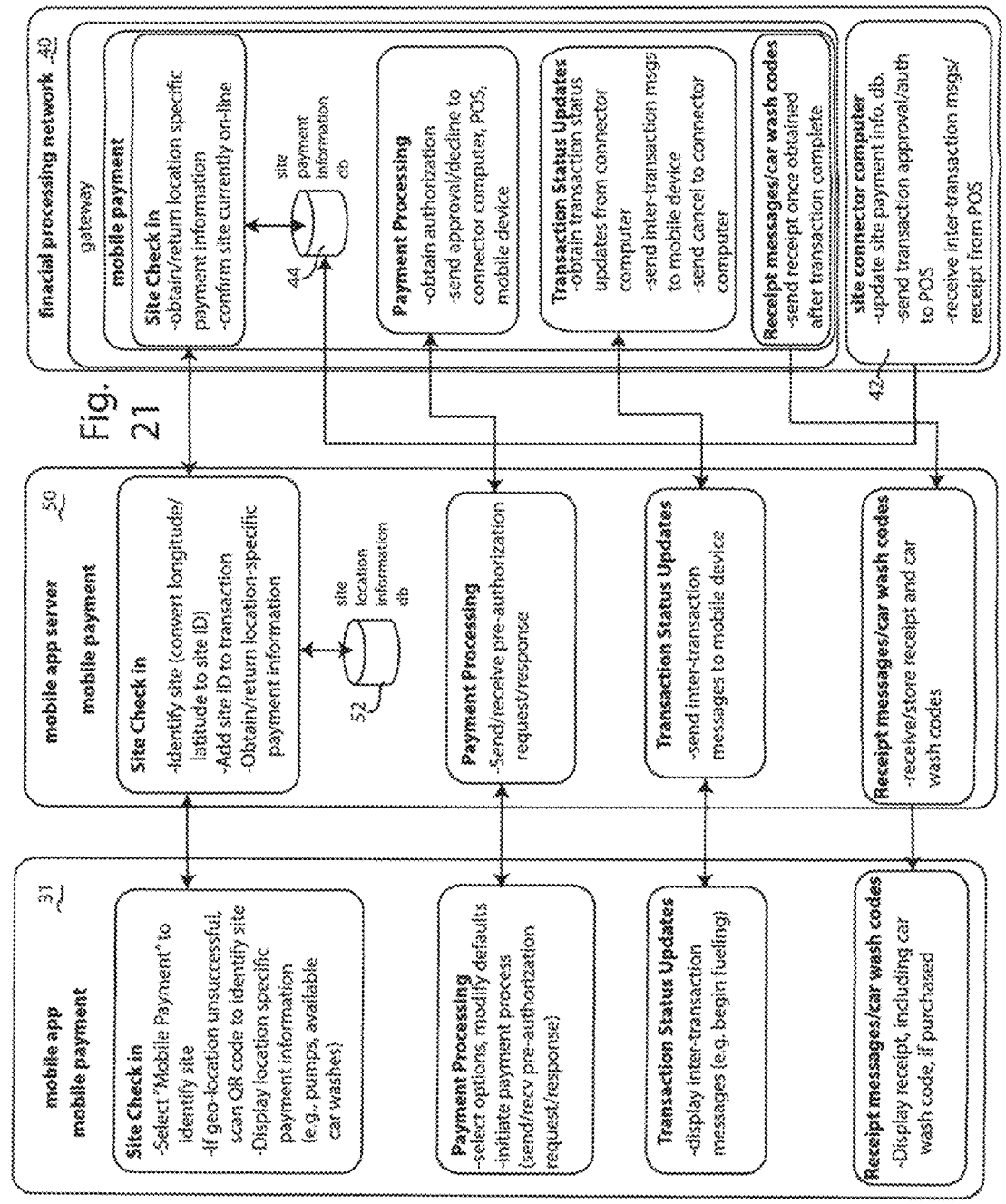

SYSTEM AND METHOD TO PURCHASE AND DISPENSE FUEL AND OTHER PRODUCTS USING A MOBILE DEVICE WITH IMPROVED USER EXPERIENCE

CROSS-REFERENCE TO RELATED APPLICATIONS

This application claims the benefit of provisional U.S. application 61/859,676 filed on Jul. 29, 2013, of which is hereby incorporated in its entirety by reference herein.

FIELD OF THE INVENTION

The present disclosure relates generally to computer system architectures and methods to facilitate use of a mobile device to purchase and dispense fuel from a dispensing site having an electronic point-of-sale system. More particularly, the disclosure relates to systems and methods to provide an improved user experience.

BACKGROUND OF THE INVENTION

This section provides background information related to the present disclosure which is not necessarily prior art.

It has been estimated that there are approximately 16,000 retail locations in the United States that sell fuel to the public. Many of these fuel dispensing stations have multiple pumps that are each equipped with a credit card reader that communicates through the station's electronic point-of-sale system (POS). The point-of-sale system, in turn, communicates with a financial processing network that may include connection to one or more credit card processing networks.

It is also estimated that there are approximately 240,000,000 vehicles in the United States. If each station serves 100 customers per day, this would amount to 16,000,000 pump activations per day. The actual number is likely considerably higher.

While the credit and debit card processing networks, and ACH funds transfer networks have heretofore proved adequate in handling this volume, credit cards are inconvenient in many climates. When a customer wishes to purchase fuel at a self-service dispensing site, the customer must exit his or her vehicle, swipe the credit card through the card reader on the pump, in some instances enter a zip code or other passcode, and then wait for the card to be authenticated before dispensing can commence. While this activity may seem insignificant on a balmy day, the same cannot be said when the temperature is 10° below zero or 95° in the shade, or when high winds, driving rain or blizzard conditions are raging.

SUMMARY OF THE INVENTION

This section provides a general summary of the disclosure, and is not a comprehensive disclosure of its full scope or all of its features.

With the overarching objective to improve the user experience, the system and method described here allows the user to user to pull up to the pump and then use his or her cellular phone or other mobile device to commence the fuel purchasing transaction, all without getting out of the car. Only after the pump has been determined to be operative and the user's purchasing authorization has been approved is it necessary to get out of the car. Then, the user simply lifts the pump handle, inserts the nozzle into the filler neck and squeezes the nozzle handle to commence fueling. To further improve the user experience the customer can provide personal preferences, such as preferences for receiving receipts, preferences for obtaining car wash prompts, and the like, by entering those into his or her mobile device. This is a major time saver.

To provide this improved user experience, the computer-implemented fuel dispensing system employs an architecture that advantageously minimizes the latency among the various system components involved in the dispensing site and dispensing pump, ascertaining the pump's availability, negotiating with the financial processing network to assess the user's purchasing authorization and interacting with the electronic point of service equipment at the dispensing site to send the appropriate authorization signal to the pump. In this regard, it will be appreciated that the physical locations of the respective computer system components are likely to be physically dispersed, often over long distances. The computer architecture described here advantageously accommodates these distances through an arrangement that significantly minimizes latency so as to optimize the user experience.

In addition to optimizing the user experience by managing latency, the computer architecture described here also provides enhanced security through mechanisms that will be described that accept the reality that communication over the public internet is potentially vulnerable to security breach and thus places aspects of the system requiring higher security in portions of the architecture where secure communication is viable.

Accordingly, the computer-implemented fuel dispensing system facilitates use of a mobile device to purchase and dispense fuel from a dispensing site having an electronic point-of-sale system that mediates operation of at least one fuel dispensing pump using funds administered by a financial processing computer network. The system includes a site connector computer programmed to administer a site database and to provide a site connector interface adapted to be coupled securely to the point-of-sale system of at least one site. The site connector computer is programmed to define in the site database a data structure that stores site-specific information about the dispensing site including the site location and pump identifying information from which the number of pumps at the dispensing site may be ascertained, as well as other site specific information (e.g. car wash package names and prices). The site connector computer is further programmed to communicate with the electronic point-of-sale system and populate a record in said site database according to said data structure using information obtained from said at least one site.

The computer-implemented fuel dispensing system further includes a mobile app server computer programmed to support Internet communication with the mobile device and also to communicate securely with the financial processing computer network. The mobile app server computer is programmed to communicate queries to and receive information from the site database. The mobile app server computer is further programmed to ascertain a site location from the mobile device upon user interaction via the mobile device and to use said site location to issue a query to the site database to acquire the pump identifying information from the site database. The mobile app server computer communicates the pump identifying information to the mobile device for use in making a pump selection based on the pump identifying information. The mobile app server computer receives from the mobile device a pump selection identifier and issues a fuel purchase instruction that includes the pump selection identifier to the financial processing computer network.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 15 is a database schema diagram depicting a schema useful in implementing the site database;

FIG. 16 is a block diagram view depicting how the mobile app server is constructed;

FIG. 17 is a block diagram illustrating how the site connector computer is constructed;

FIG. 18 is a block diagram illustrating how the above site transaction integrator is constructed;

FIG. 21 is an interface diagram showing the mobile payment functionality.

Corresponding reference numerals indicate corresponding parts throughout the several views of the drawings.

DETAILED DESCRIPTION OF THE EMBODIMENTS

Example embodiments will now be described more fully with reference to the accompanying drawings.

Figure 1:
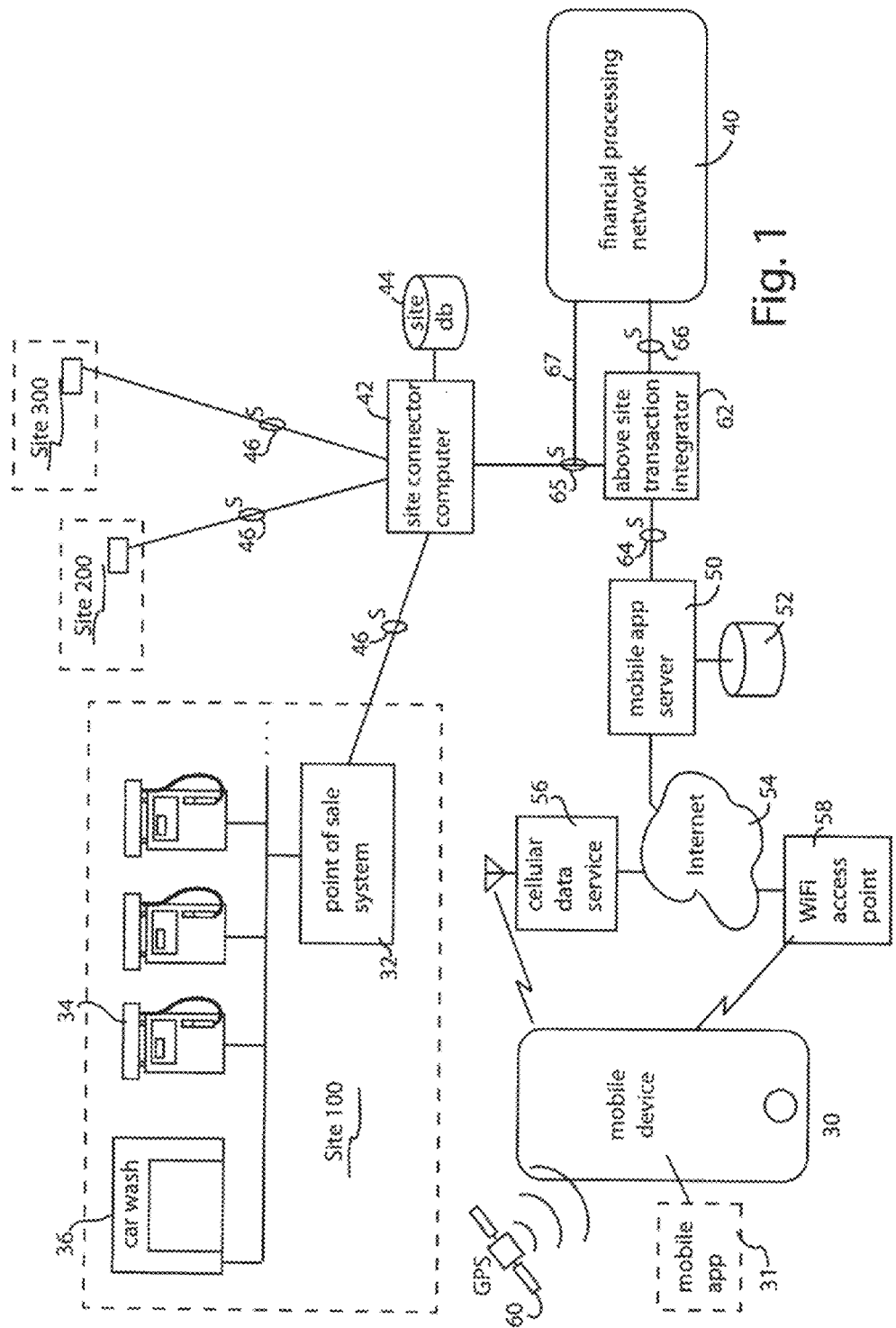
FIG. 1 is a system block diagram of a computer-implemented fuel dispensing system in accordance with the present disclosure.

Referring to FIG. 1, a computer-implemented fuel dispensing system is illustrated. The system facilitates use of a mobile device 30, such as a smart phone, to purchase and dispense fuel from a dispensing site (exemplary dispensing sites 100, 200 and 300 having been illustrated). Each dispensing site has an electronic point-of-sale system (POS) 32 that mediates operation of at least one fuel dispensing pump 34, and also other product or service vending equipment such as an automated car wash 36. The system is designed to facilitate dispensing fuel or making other purchases using funds administered by a financial processing computer network 40.

The system includes a site connector computer 42 which may be implemented by a single computer or by a system of networked computers. The term site connector computer 42 as used here is intended to cover both single computer and multiple networked computer embodiments.

Site connector computer 42 is programmed to administer a site database 44 and to provide a site connector interface that couples via a secure connection 46 to the point-of-sale system 32 of each site. The site connection computer is programmed to communicate with the electronic point-of-sale system in order to populate a record in the site database 44, according to a predefined data structure that will be discussed more fully below, and thereby capture and store information obtained from the site. The site database is configured to store one record for each site that is connected to the site connector computer 42.

The computer-implemented fuel dispensing system further includes a mobile app server computer 50, which may be implemented using a single computer or a plurality of computers networked together. As used here, the term mobile app server computer is intended to cover both embodiments. The mobile app server computer administers a mobile app database 52 that stores information obtained from the user of the mobile device 30 and also obtained from the site database 44. The information stored in mobile app database 52 is communicated by the mobile app server computer to and from a mobile app 31 running on the mobile device 30. The mobile app provides the user interface by which the user gains access to the computer-implemented fuel dispensing system.

The mobile app server computer 50 communicates with the mobile device 30 over the internet 54, as illustrated. While there are several ways to accomplish this internet connection, FIG. 1 illustrates two popular options. The mobile device 30 may communicated with the mobile app server using a cellular data service 56. In this embodiment, the mobile device 30 subscribes to a cellular data service 56 and the data service provides connectivity to the internet 54. As an alternative, mobile device 30 can also gain access to the internet via a wi-fi access point 58. The wi-fi access point may be implemented as a wi-fi hotspot that is physically located at the fuel dispensing site with sufficient transceivers and antennae to provide good coverage when users enter the site.

Preferably, the mobile device 30 is equipped with geolocation circuitry, allowing the device to receive GPS data from the GPS satellite network 60. The mobile device 30 can also obtain geolocation information by triangulation among cellular data service towers, if the mobile device is subscribed to a cellular data service 56. As will be explained, the geolocation information is communicated from the mobile device 30 to the mobile app server 50, allowing the mobile app server 50 to ascertain the identity of the particular dispensing site at which the mobile device 30 is located. The mobile app server 50 uses this site location information to issue a query to the site database 44 to acquire individual pump identifying information from the site database. In this regard, some of the information stored in the site database 44 comprises site location identifiers and pump identifying information from which the number of pumps at the particular dispensing site may be ascertained. The mobile app server computer 50 obtains pump identifying information from the site database 44, which is kept up to date through operation of the site connector computer 42, and communicates pump identifying information to the mobile device 30.

The mobile device 30 is thus provided with sufficient pump identifying information to allow it to display for user selection individual pump designators (e.g., pump numbers) for each of the dispensing pumps at that particular site. By virtue of the computer architecture, the system is able to supply pump identifying information to the mobile device quite rapidly (i.e., low latency) to ensure that the user has an optimal experience. By way of non-limiting example, the architecture depicted in FIG. 1 will supply pump identifying information to the user within 10 seconds after the mobile app 31 has been launched on the user's mobile device 30, assuming geolocation services are functioning normally. Low latency is ensured because the site connector computer 44 interrogates the point-of-sale systems 32 of all connected sites independently of the mobile app server computer operation. Thus, the site connector computer 44 is responsible for maintaining the site database with up to date information about the number of fuel dispensing pumps 34 and other vending systems such as automated car wash 36, optionally including an indication as to whether each dispensing device is currently operational. Up to date site information stored in site database 44 serves as a dedicated data repository that the mobile app server computer can interrogate without the need to send pump identifying queries all the way to the point-of-sale system of the respective site. This computer architecture thus not only shortens latency by eliminating the need to route queries fully between the mobile app server computer and the point-of-sale system 32, but it also introduces data path uniformity. In this regard, dispensing sites 100, 200 and 300 may be located in widely diverse regions of the country, with different communication path lengths and thus different latencies. These different path lengths are effectively neutralized by the site connector computer 42, which stockpiles up to date information about each dispensing site in the site database 44.

The computer-implemented fuel dispensing system employs a data security architecture that recognizes the reality that communication over the internet may not be secure. Thus, the system is designed so that only the mobile app server computer 50 communicates over the internet with the mobile device 30, with such communication being limited to message transmissions that contain no financial data. The remainder of the computer-implemented fuel dispensing system uses dedicated secure connections, such as illustrated at 64, 65, 66 and 67. Specifically, a computer circuit designated as the above site transaction integrator 62 routes information among the mobile app server, site connection computer and the financial processing network. Note that the financial processing network 40 may ultimately communicate with the site connector computer 42 either with the above site transaction integrator 62, via secure connections 65 and 66, or directly via secure connection 67.

Figure 2:
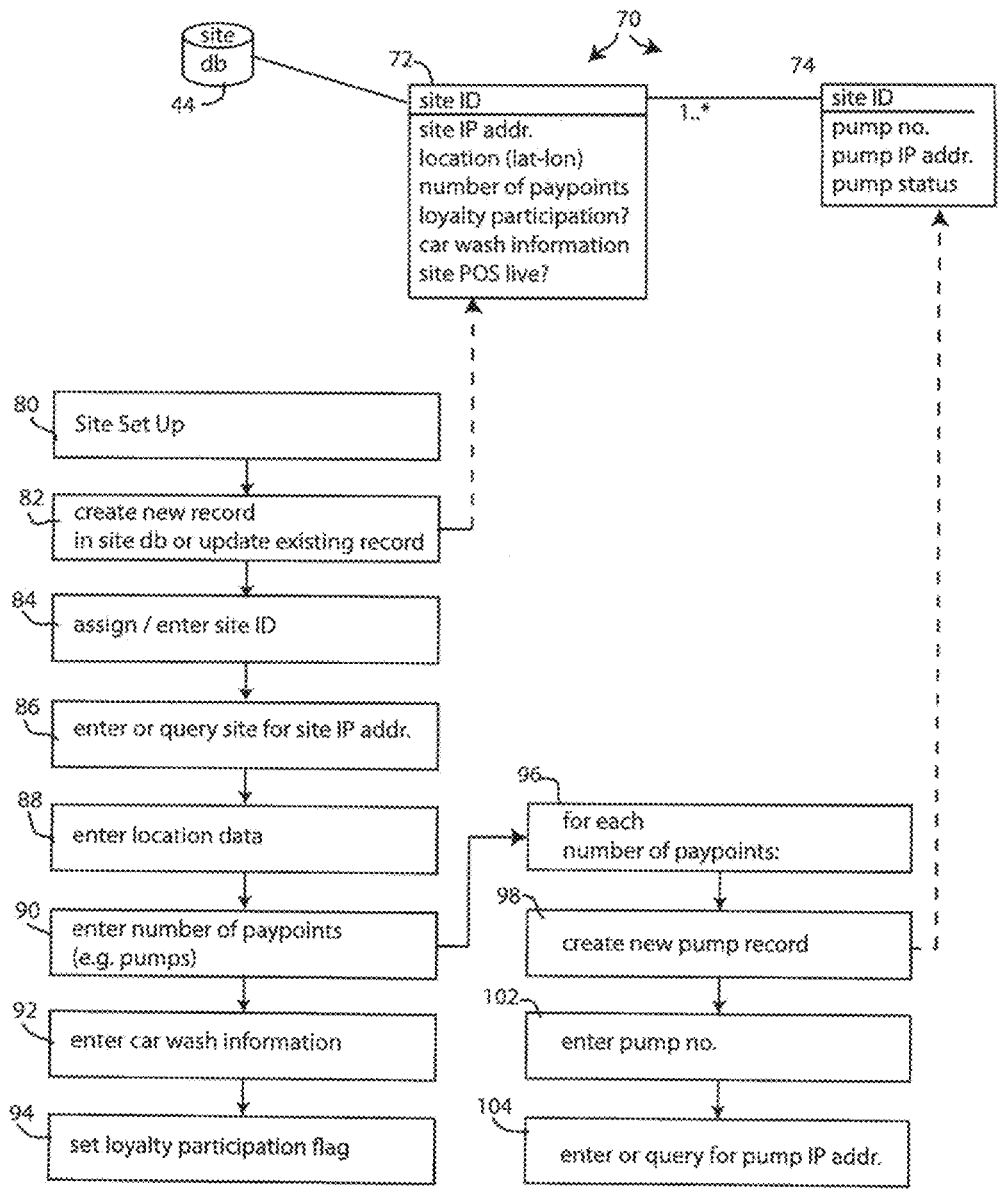
FIG. 2 is a database schema diagram and associated flowchart illustrating the steps performed by the site connector computer in populating records in the database.

FIG. 2 shows the site database 44 and the presently preferred site database data structure 70 in greater detail. The site database 44 is configured as a relational database comprising a site table 72 and an associated pump table 74. There exists a one-to-many relation between the site table and the pump table. The tables are related through the site ID field as illustrated. Although additional information can also be stored in these tables, the illustrated configuration uses a numeric or alphanumeric site ID, assigned so that a given site ID number or value is unique for each site administered by the computer-implemented fuel dispensing system. These site IDs may be sequentially assigned for example. The site table may also store the store IP address corresponding to the IP address of the point of sale system 32. The site table may also include site location information, such as latitude-longitude information. The site table may also include pump identifying information, such as the number of pay points at the particular site. In this regard, pay points are individual pumps and/or other automated dispensing or vending terminals, such as the automated car wash 36. The site table may also include a Boolean datum indicating whether the given site participates in a customer loyalty program. If desired, the site table can be further expanded to include additional data regarding such loyalty program. Similarly, the site table may include one or more fields to contain information about other products being offered, such as car wash products. Finally, the site table includes a Boolean datum indicating whether the site's point-of-sale system 32 is live. In this regard, each point-of-sale system 32 includes a watchdog timer circuit that counts down a predefined time interval and then issues a site live message to the site connector computer 42. The site connector computer stores a record of having received the periodic watchdog message from the point-of-sale system, associating a time stamp with the received message. Thus, each time the watchdog signal is sent, the time stamp for that point-of-sale system is updated in the site connector computer. Then periodically the site connector computer interrogates all of its stored watchdog time stamp data and sets the site POS live Boolean datum for each site according to whether that site has reported in (via the watchdog message) since the last check in cycle. Any sites that did not check in during the immediately preceding check in time interval are marked as "down", serving as an indication that the automated systems for that site are not operating and hence cannot be interactive by the interactive fuel dispensing system.

The pump table 74 is referenced by site ID to the site table 72, as illustrated. The pump table stores a record for each pump (and each other pay point device, such as car wash 36). A unique pump number is associated with each device and stored in table 74. Also stored in table 74 is the pump IP address and optionally a Boolean datum giving the individual pump status. If, for example, a certain pump is out of order, the station attendant can indicate this fact in the point-of-sale system and thus the pump status for that pump can be communicated from the point-of-sale system to the site connector computer for storing in the pump table within the site database.

FIG. 2 also shows how the site connector computer is programmed to administer the site database. The site table record is set up and/or updated beginning at step 80. If the record being written to table 72 corresponds to a new site being added, then a new record is created at step 82. Otherwise, if an existing record is being updated, the site connector computer first does a query to retrieve the corresponding site record, placing a lock on the record so that changes can be made without interference by other processes. If the record being created is a new site, a site ID is assigned for that site at step 84. The site ID can be assigned automatically using a sequential numbering scheme. So that the site records can be distinguished from one another, the site ID for each record must be unique. If the record being updated corresponds to an existing site, the site ID will already have been entered. Thus, one way to retrieve or look up the information for that site is to perform a query using that site ID.

At step 86 the IP address for the site is entered (or edited). The site IP address corresponds to the unique identifier used by the computer-implemented fuel dispensing system for the purpose of routing messages within the system. Thus, the site IP address for each site corresponds to a particular piece of electronic equipment, namely the point-of-sale system within each site. In contrast, the site ID is simply a database designator used to uniquely identify each record in the database.

At step 88, location data for the site is entered into the site table. This location data may comprise latitude-longitude data, although other designations including street address information may also be included. If desired, the point-of-sale system 32 may be augmented to include geolocation circuitry capable of receiving geolocation information from the GPS satellite network 60. In such case, the point-of-sale system 32 can automatically acquire its geolocation and communicate that information to the site connector computer for storing in the site database. Alternatively, the geolocation information can be added manually by a user operating a terminal connected to the site connector computer. Ultimately, the location data for each site will be communicated to the mobile app server for storing in the mobile app database. As will be discussed, it is the mobile app server 50 that performs the lookup within mobile app database 52 to determine what site ID is associated with the corresponding geolocation. Operation in this fashion gives faster results because the record lookup within the site database 44 is faster when the query is based on a site ID. It is, of course, possible to perform a query on site database 44 using the latitude-longitude information of the site; however, such query typically takes longer.

At step 90, the number of pay points (e.g., dispensing pumps, automated car wash, etc.) is entered. This number can be ascertained by issuing a query to the point-of-sale system 32, or alternatively by manual entry of a human operator of a terminal connected to the site connector computer. Entry of the number of pay points allows the site connector computer to substantiate records for each pay point, as depicted in steps 96-104, discussed below. In a minimal configuration, the site database 44 will include pump identifying information (such as the number of pay points) as the means by which the system displays on the mobile device pumps available for user selection. In a more feature-rich embodiment, the site table 72 also includes optional car wash information, entered at step 92 and optional loyalty participation information entered at step 94. The car wash information entered at step 92 might include, for example, a description of standard prices or special offers, which information will be communicated to the user via the mobile device 30. Whether the particular site participates in the customer loyalty program is set by a Boolean value or flag.

Populating the pump table 74 is similar to the process for populating the site table 72. The site connector computer iteratively performs steps 98-104 for each of the respective pay points (e.g., dispensing pumps, automated car wash, etc.). If a new site is being configured, a new pump record is instantiated at step 98 for each pump or pay point. Then the pump number is assigned and entered at step 102 and finally the pump IP address is entered or determined by query of the point-of-sale system at step 104. The pump IP address corresponds to the network address at which the particular pump communicates. This IP address is needed to directly activate the pump. Such direct activation is typically handled through the point-of-sale system. It is possible that some point-of-sale systems do not communicate with their connected pumps using the IP address protocol. Some systems may simply have a direct, circuit-switched connection over which control commands are issued from the point-of-sale system to the individual pump. In such case, the pump IP address information is simply not recorded at step 104.

Figure 3:
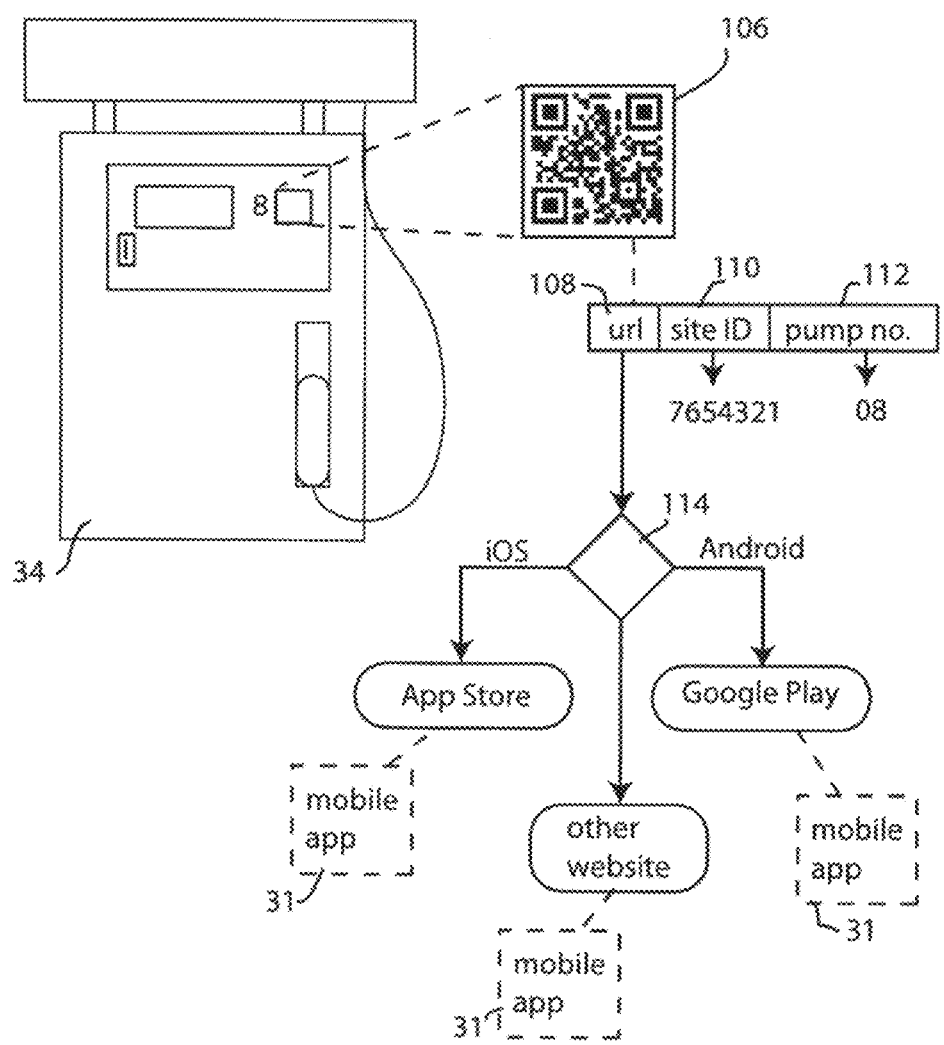
FIG. 3 is a detailed view illustrating how the QR code is parsed.

As noted above, the mobile device 30 executes a mobile app 31 to interact with the computer-implemented fuel dispensing system. During normal use, this mobile app will already have been installed on the user's mobile device and thus the user simply activates or loads the mobile app 31 and begins using it. In the event the user has not previously loaded the mobile app onto his or her mobile device, the computer-implemented fuel dispensing system provides a convenient way of acquiring this mobile app. As shown in FIG. 3, each pump 34 may be equipped with a QR code 106 that embeds at least 3 different types of information. Embedded in QR code 106 is a universal resource locator or URL identifier that can be used to acquire a mobile app version that suits the user's particular mobile device and its operating system. The QR code also embeds the site ID 110, corresponding to the dispensing site where the pump is located, and the pump number 112, corresponding to the particular pump under which the QR code 106 is affixed. The site ID 110 would thus correspond to the site ID 72 within the site database, and the pump number 112 would correspond to the pump number within the pump table 74 of the site database.

If the user has not yet installed the mobile app 31, then the site ID 110 and pump number 112 embedded in the QR code 106 will have no relevance to the mobile device. Instead, the user simply loads or runs a previously installed, generic QR code reader and then using the mobile device camera, the user takes a picture or otherwise obtains an image of the QR code 106. The generic QR code reader parses the QR code using the URL 108 to access a website. The website then determines which operating system the user's devices is using and then directs the mobile device automatically to the appropriate site where the mobile app 31 can be obtained for use on that particular device. Thus, as illustrated at FIG. 3, the website 114 will route the request according to what operating system is used to access the site. Such information is typically provided each time the mobile device accesses a website. Thus, if the mobile device uses the Apple iOS operating system, the user is directed to the Apple App Store. Alternatively, if the mobile device is using an Android operating system, the user is directed to the Google Play site. If other operating systems are detected, they will likewise be directed to other websites. In each case, the user is directed to the appropriate source, with sufficient information to identify the mobile app 31 for uploading to the user's mobile device.

Having installed the mobile app onto the mobile device, the user can now operate the mobile app by selecting it in the manner that other apps are selected for that mobile device. The mobile app 31, itself, includes the ability to read QR codes. The QR code reading functionality is provided so that the mobile device can parse the QR code affixed to the pump if needed. Ordinarily, such scanning of the QR code at the pump is not needed. Indeed, when geolocation services are operating normally, the user can interact with the computer-implemented fuel dispensing system entirely from within his or her car. However, when the geolocation services are not functioning, the user can scan the QR code affixed to the pump and thereby provide the mobile app with the site ID 110 and pump number 112 embedded in the QR code. This QR code scanning functionality is thus provided as a fallback in the event geolocation services are not available.

Figure 4:
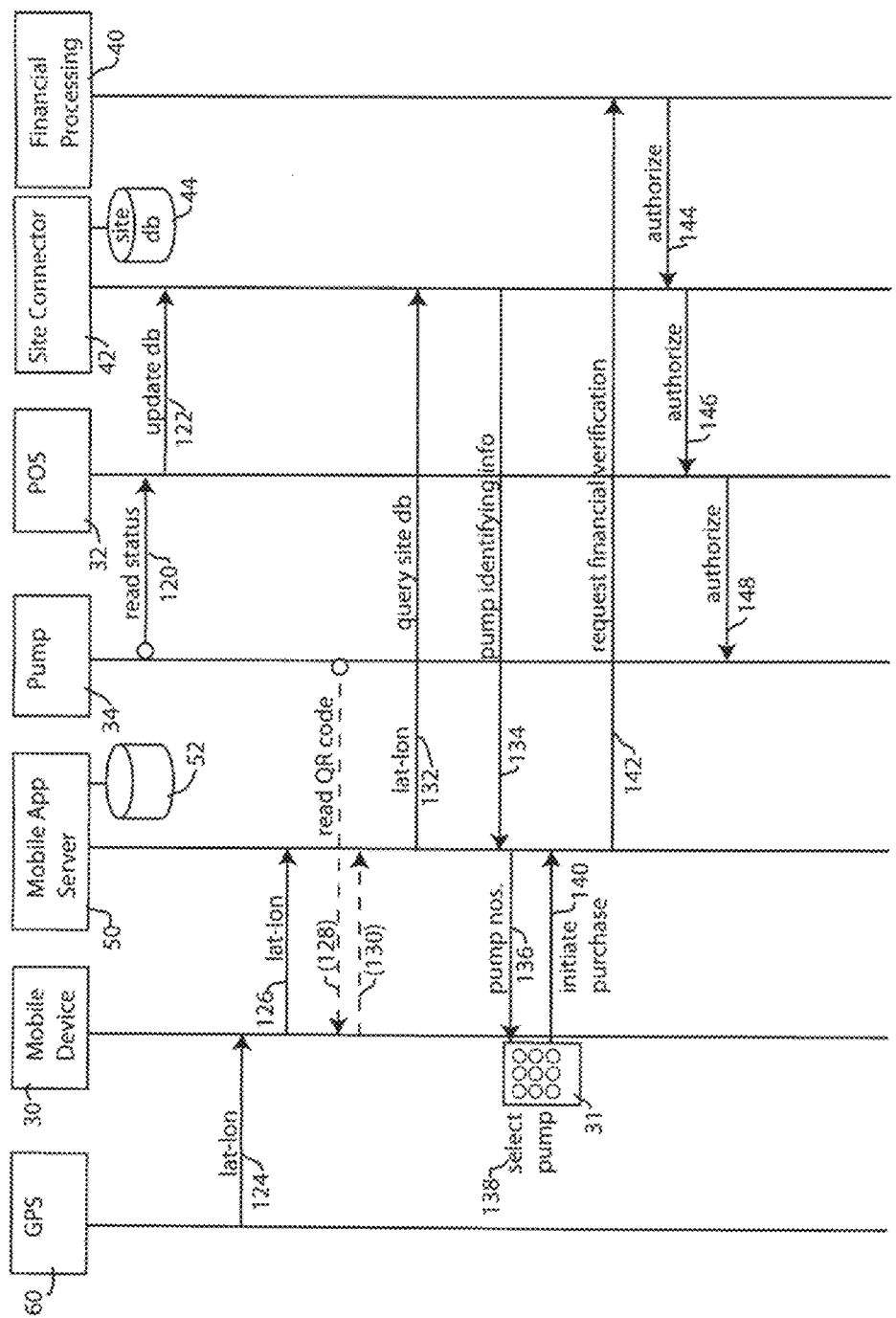
FIG. 4 is a sequence diagram illustrating how messages are passed among components of the fuel dispensing system.

Before proceeding with a detailed explanation of each of the components within the computer-implemented fuel dispensing system, an overview of the basic information among systems may be helpful. Refer therefore to FIG. 4. FIG. 4 is a sequence diagram in which various communicating components have been identified using the referenced numerals found in FIG. 1. Independent of the mobile device 30, the point-of-sale system (POS) 32 reads the status of each pump 34 to which it is connected [message 120] and provides that information, along with its own status information to the site connector computer 42 which stores this information in site database 44 [message 122]. This updating of the site database occurs periodically and without involvement of the mobile app server 50 or the financial processing network 40.

When the user approaches a dispensing site, wishing to purchase fuel, the GPS satellite network 60 provides latitude and longitude information to the mobile device 30 [message 124] and that information is then communicated to the mobile app server [message 126]. If latitude and longitude information is not available from GPS satellite network 60, the user can alternatively read the QR code from the pump into the mobile device [message 128] and the location information read from the QR code is then sent to the mobile app server [message 130].

When relying on GPS information, the mobile app server uses the latitude-longitude information to issue a query to the site database via the site connector 42 [message 132]. The retrieved pump identifying information from site database 44 is then communicated to the mobile app server [message 134] and used to provide the mobile app 31 with pump number information [message 136]. The user then uses the mobile app 31 to select a pump [138] and this selection is then incorporated into the initiate purchase command [message 140] issued from the mobile device to the mobile app server. When relying on the QR code, the user does not need to select the pump since that information is embedded in the QR code.

Once the initiate purchase message is received by the mobile app server, the mobile app server requests financial verification based on the user identifying information [message 142]. If the user can be authenticated by the financial processing network 40 as having the appropriate account to consummate the transaction, the financial processing network sends an authorization message [message 144] to the site connector 42, which in turn issues an authorization message [message 146] to the point-of-sale system 32 [message 148]. The point-of-sale system then activates the pump [message 150] so that it can then be used to dispense fuel when the user removes the nozzle from its stored position and squeezes the nozzle handle to commence filling.

Figure 5:
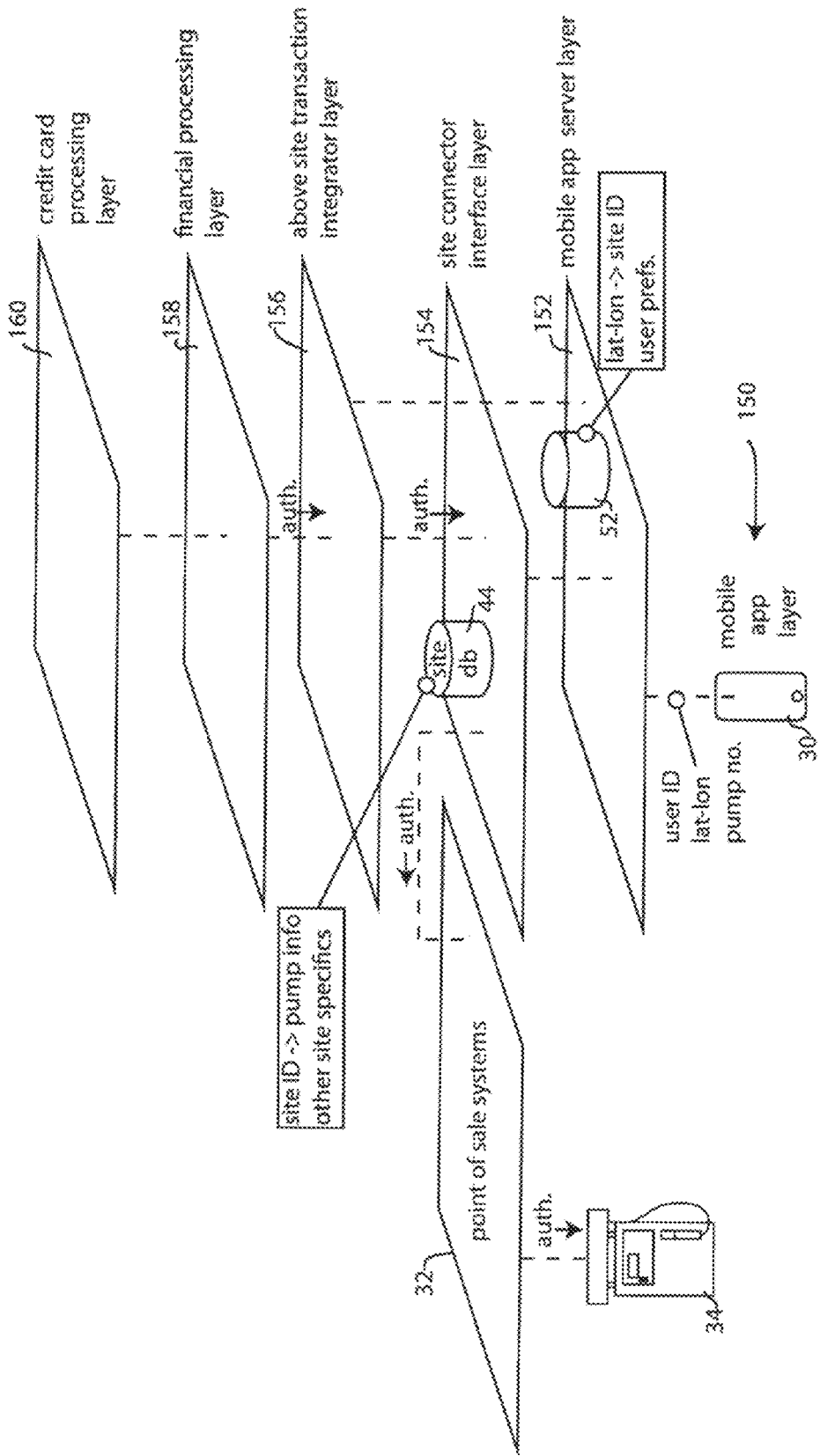
FIG. 5 is an architectural diagram depicting how different aspects of the fuel dispensing system are hierarchically arranged.

The computer-implemented fuel dispensing system utilizes a tiered or layered architecture, which will now be further described in connection with FIG. 5. The lowermost layer in FIG. 5 is the mobile app layer 150. The mobile app layer is implemented on the mobile device 30 when the mobile app 31 (FIG. 1) is installed and run by the processor within the mobile device. The mobile app layer 150 is treated by the remainder of the computer-implemented fuel dispensing system as an insecure layer. The mobile app layer 150 communicates with the next-above layer, the mobile app server layer 152. The mobile app server layer 152 represents the line of demarcation between the assumed-to-be-insecure mobile app layer 150 and the remaining layers that are all secure. The mobile app layer 150 minimally communicates 3 types of information with the layers above: user ID information, latitude-longitude information and pump selection (pump number) information. Except during the enrollment process, user credit card information is not conveyed between the mobile app layer 150 and the mobile app server layer 152.

The mobile app server layer 152 occupies a first stage of information storage, namely the mobile app database 52 which is administered by the mobile app server computer 50 (FIG. 1). Minimally, the information stored at the mobile server layer comprises latitude-longitude to site ID lookup information. In addition, user preferences, if implemented, are stored at the mobile app server layer. The mobile app server layer 152 thus serves as the proxy of the mobile app on the secure side of the insecure-secure line of demarcation. The mobile app server layer is configured to handle communications with potentially hundreds of thousands of user interactions per day. The mobile app server layer communicates securely with the site connector interface layer 154 above it.

The site connector interface layer 154, in turn, communicates with the point-of-sale systems 32 distributed across the country. The site connector interface layer 154 thus effectively serves as the proxy of the many individual dispensing sites throughout the country. The site connector interface layer 154 communicates securely with the point-of-sale systems 32 and also with the above site transaction integrator layer 156 above it. Notably, the site connector interface layer functions as the second data repository within the computer-implemented fuel dispensing system. The site database 44, administered by the site connector computer 42 (FIG. 1) serves as this second system information store. Minimally, the site connector interface connector stores the lookup information allowing the system to ascertain pump information for a given site ID. The site connector interface layer populates the site database 44 through communication with the point-of-sale systems 32, either by periodically polling each site to pull information from the point-of-sale systems, or by responding to information update messages pushed to the site connector interface layer from the point-of-sale systems. Notably, the site connector interface layer updates and maintains its data store independently from the mobile app server layer 152. In other words, the information store in mobile app server layer 152 and the information store in site connector interface 154 are asynchronously maintained.

The remaining layers above the site connector interface layer are generally considered to be above the level of the individual sites. Thus, to provide a line of demarcation between the site and the financial processing layers above it, an above site transaction integrator layer 156 is provided. This layer communicates securely with the site connector interface layer below and the financial processing layer 158 above. The above site transaction integrator layer 156 serves generally a message routing function, sending communications between the financial processing layer and the site connector interface layer, and also the mobile app server layer. In some implementations, the above site transaction integrator layer may be collapsed into the financial processing layer 158, however, it is shown exposed as a separate layer here to facilitate the discussion.

The financial processing layer 158 is generally responsible for validating the user ID information insofar as it serves as a token representing the user's available debit or credit card funds. If desired, the financial processing layer 158 may, in turn, communicate with a credit card processing layer 160. In some implementations, the credit card processing layer 160 would be collapsed into the financial processing layer 158. It is shown separately here merely for clarity.

Ultimately, the computer-implemented fuel dispensing system must authenticate the user ID to determine if the user has adequate funds to make the purchase, and then send a suitable authorization signal (AUTH) to activate the chosen pump at the designated site. Thus, in FIG. 5 the authorization message (AUTH) is shown being conveyed from the financial processing layer 158 to the above site integrator layer 156 and then to the site connector interface layer 154. From there, the message is communicated to the appropriate point-of-sale system 32 and then to the pump 34. Although shown here as a single message, in practice a series of messages of different protocols may be used, with the financial processing layer authentication message triggering the dissemination of a site connector interface layer authorization message, and so forth.

As sent from the financial processing layer 158, an authorization message represents the customer's agreement and ability to pay for the purchase. Whether a particular site will ultimately consummate that transaction depends on additional factors beyond the customer's agreement and ability to pay. For example, if the particular grade of fuel requested by the customer is not available, the computer implemented fuel dispensing system may refuse the transaction. Similarly, if a particular dispensing pump is inoperative, the system will likewise refuse the transaction. Depending on the implementation, these refusals to consummate the transaction may be handled either at the above site transaction integrator layer 156, at the site connector interface layer 154, or even at an individual point-of-sale system 32.

From FIG. 5, it will be seen that the authorization messages are all communicated on the secure side of the computer-implemented fuel dispensing system. This protects the dispensing pumps from being accessed by devices connected to the public internet. Although the multi-layer computer-implemented fuel dispending system is quite complex, serving hundreds of thousands of customers and supporting thousands of sites, the user experience is quite responsive. Typically, the user is able to open the mobile app on his or her mobile device and make a pump selection within 10 seconds or less. This is made possible by the low latency architecture where pump identifying information and other site-specific information is collected ahead of time and stored in the site connector interface layer 154, where the mobile app server layer 152 can readily access it. Latency is kept low because the mobile app server layer 152 and the site connector interface layer 154 enjoy a dedicated secure connection between them. Thus, it is not necessary for the user's mobile device to issue a query to the point-of-sale system in order to learn the number of pumps available at that site.

In addition to providing low latency, the layered architecture can advantageously store additional information in the respective mobile app server layer and site connector interface layer. Specifically, the computer-implemented fuel dispensing system presents a user-customized behavior made possible by a set of stored user preferences for each user ID. These user preferences are input through the mobile app on the mobile device 30 and are then stored in the mobile app server layer, within the mobile app database 52. These user preferences offer a wide range of performance modification capabilities. For example, if a user prefers to receive receipts by email versus printed paper ticket, those preferences can be indicated and stored in the mobile app database 52. Thus, when the user makes a purchase, the mobile app server layer automatically implements the user's preferred receipt-generating behavior. Similarly, if the user has a preference to purchase a car wash under certain conditions, those can be entered as user preferences and the car wash can be automatically added to the transaction. Because the mobile app server layer is in communication with the site connector interface layer, it is also possible to associate user preferences with specific sites. At the mobile app server layer, the site ID can be added to a user preference, thereby establishing a user preference for a particular site. For instance, a user may prefer to be offered car washes at certain sites but not others. Thus the mobile app server layer, and the mobile app database 52 serves as a mechanism to offer enhanced features to the customer directly on the mobile device, such as offering car washes and other products, offering special pricing and discounts, and administering customer loyalty programs.

Just as user preferences are stored at the mobile app server layer to customize the behavior of the system, site specific data may also be stored at the site connector interface layer 154, to customize how the computer implemented fuel dispensing system presents itself when customers visit particular sites. For example, if a particular site is offering a special discount on beverages, that information can be stored in the site database 44 at the site connector interface layer. When the mobile app server layer 152 issues a query to the site connector interface layer, these special offers can be selectively returned in response to that query, thereby making the special offers available at the mobile app server layer where they can be communicated to the mobile app layer 150. In this way, the behavior of the computer-implemented fuel dispensing system can be selectively modified to support special features and special needs of individual dispensing sites.

The site database 44 and the mobile app server database 52 advantageously support the system's ability to rapidly re-prices or apply discounts to products based on information held "above site." These re-pricings and discounts may be configured to apply to a given transaction, or to a group of transactions, with the results being immediately displayed on the mobile device as well as on the subsequently generated receipt. In this regard, while configurations may vary, customer-specific discounts may be pushed to the mobile app server for storage on the customer's behalf in the mobile app database 52. Site-specific discounts, or global discounts may be pushed to the site database 44, where they may be applied to purchases by all customers, at the sites designated as participating in the discount or re-pricing program. In either case, such discounts and re-pricings may be applied either to particular purchased units, or to the total invoice amount.

Figure 6:
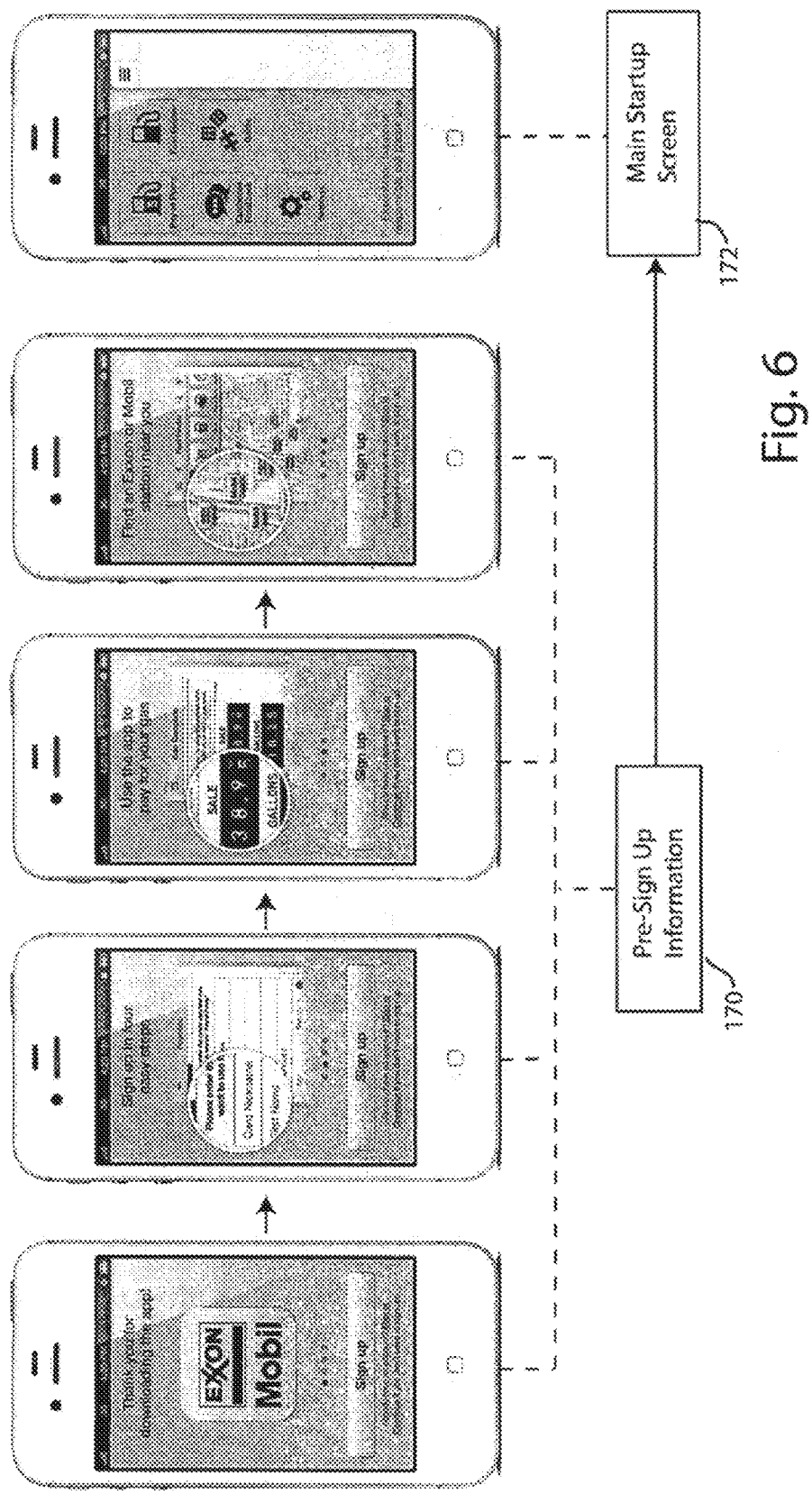
FIG. 6 illustrates exemplary mobile device user interface displays corresponding to the pre-signup information screens and the main start screen.

To further explain the user experience afforded by the computer-implemented fuel dispensing system, refer next to FIGS. 6-14 which show exemplary user interface screens generated by the mobile app 31. In this regard, FIG. 6 shows exemplary information screens that are presented sequentially as part of the pre-signup information 170. These pre-signup information screens provide information to the user on how to register the downloaded mobile app with the mobile app server computer 50. Once this signup process is complete, the main startup screen 172 is instead displayed when the mobile app is launched.

Figure 7:
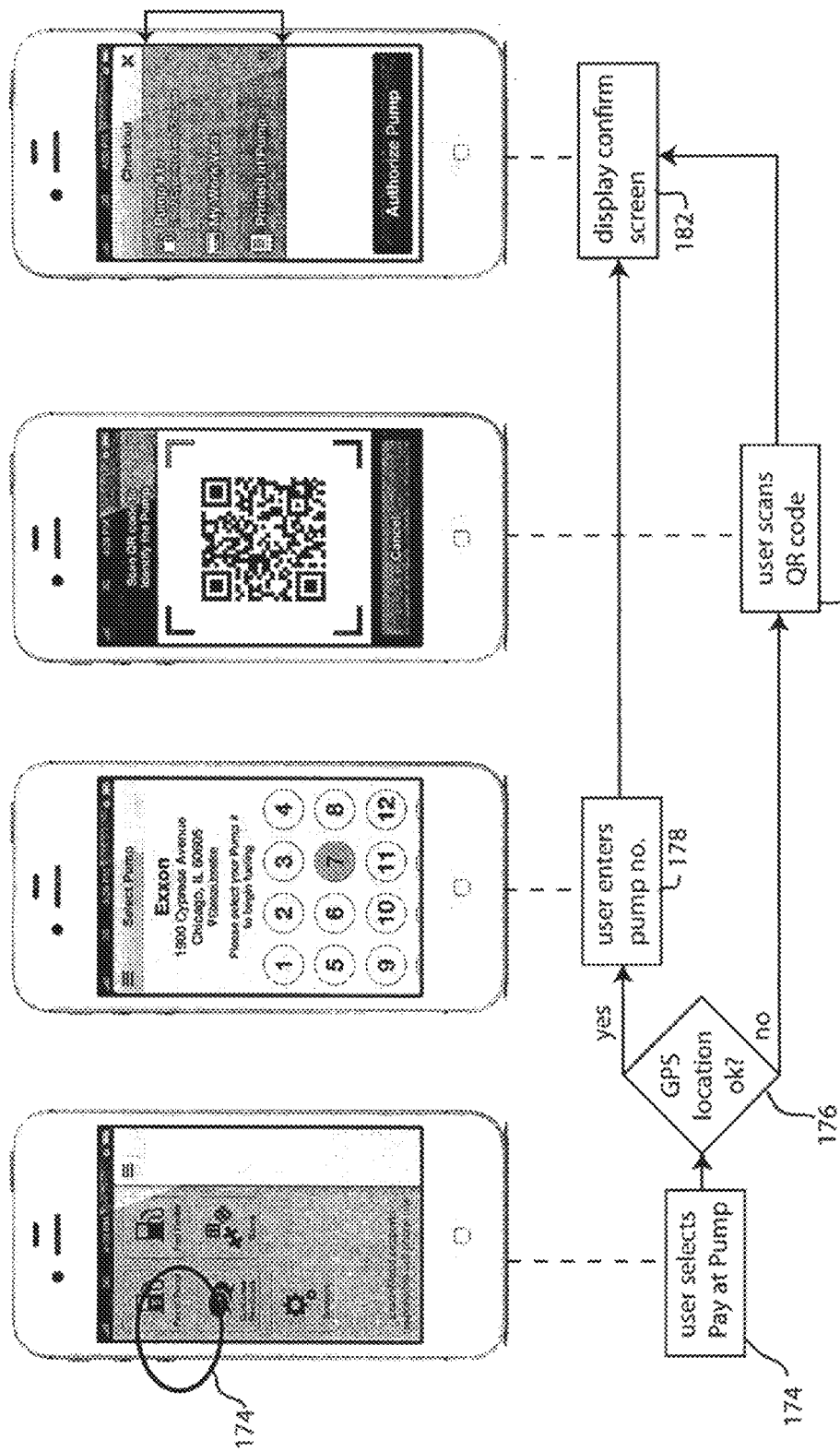
FIG. 7 depicts exemplary mobile device user interface displays that are presented to the user when a fuel dispensing purchase is initiated.

FIG. 7 illustrates the user of the main startup screen in greater detail. Specifically, when the user selects "pay at pump" by touching the corresponding icon, the mobile app initiates the "pay at pump" operation 174. The mobile app tests whether the geolocation equipment on board the mobile device was able to ascertain the location of the dispensing site using the GPS satellite network 60 (FIG. 1). If the GPS location was obtained, the mobile app communicates the GPS location to the mobile app server computer, causing the mobile app server computer to issue a query to the site database to obtain the pump identifying information from which the number of pumps can be ascertained. The mobile app server computer then sends the number of pumps information to the mobile app and the mobile app generates a graphical display from which the user selects the desired pump as at 178.

Alternatively, if the GPS location is not obtained for some reason, the mobile app prompts the user to scan the QR code affixed to the pump as illustrated at 180. In this mode, the mobile app functions as a special purpose QR code reader that parses the information received from the QR code (see FIG. 3) to ascertain the site ID 110 and the pump number 112 (FIG. 3).

Thus, either by GPS location and user pump number entry, or by QR code scanning, the mobile app has acquired sufficient information to communicate the site location and pump number to the mobile app server computer. As part of this process, the mobile app also transmits the user ID to the mobile app server. Thus, the mobile app server now has enough information to begin the pump authorization process. The mobile app server accesses the mobile app database to obtain the user preferences stored there and sends a message to the mobile app allowing the mobile app to display a confirmation screen as at 182. In the graphical display of this confirmation screen the user sees not only verification of the prompt he or she has selected but also the user preferences that have been applied based on the mobile app database lookup in the mobile app server computer. In FIG. 7, these displayed preferences indicate which credit card will be used for the transaction (a user preference) and how the receipt will be printed. If the user set a preference for purchasing a car wash, the car wash selection may also be displayed on the confirmation screen 182. The displayed confirmation screen also includes a user actuable button, where by the user can request to "authorize pump". At the confirmation screen 182, each of the indicated preferences may be changed, prior to pressing "authorize pump", by pressing the preference (e.g., credit card, receipt, car wash, etc.), which then provides a drop-down menu of other possible selections.

Figure 8:
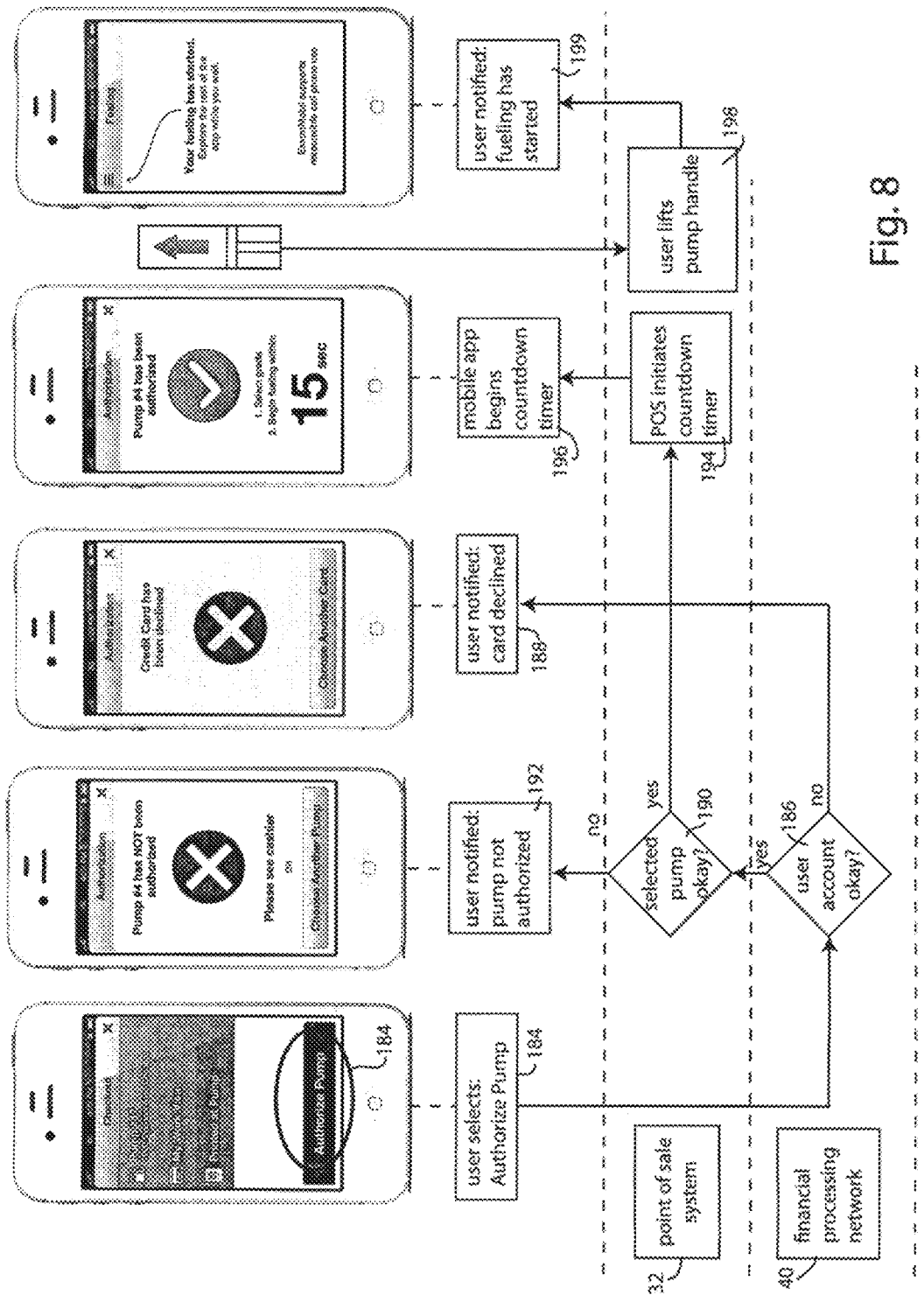
FIG. 8 depicts exemplary mobile device user interface screens and the corresponding operation of components within the fuel dispensing system involved with authorizing the fuel dispensing pump to initiate fueling.

FIG. 8 shows the "authorize pump" operation in greater detail. The procedure by which the pump is authorized represents a collaboration among the mobile app (communicated through the mobile app server), the point-of-sale system 32 and the financial processing network 40. Thus, the point-of-sale system 32 and financial processing network 40 have been illustrated as "swim lanes" in FIG. 8.

The process for authorizing the pump begins when the user selects "authorize pump" on the user interface of the mobile device as depicted at step 184. At this point, the mobile app server has already ascertained the identity of the dispensing site and the user has already selected the pump by number (or by scanning the QR code). In addition, the mobile app server has the user ID that it receives from the mobile app when the user selects "pay at pump" in the main startup screen (FIG. 7). Thus, the mobile app server communicates the user ID to the financial processing network 40, which checks the user ID against the account records maintained by the financial processing network to determine if the user account is authorized for this purchase. If not, the transaction is refused and the financial processing network 40 sends a message to the mobile app server, which is relayed to the mobile app, indicating that the user's account (e.g., credit card or debit card) has been declined as at step 188.

If the user account is approved at step 186, the point-of-sale system 32 is interrogated to determine if the selected pump is operational, as at step 190. In the illustrated embodiment, the pump availability is checked by communicating with the point-of-sale system as it has the most up to date information regarding the pump requested. Alternatively, the site database administered by the site connector computer may be interrogated to obtain this information. If the pump is not available, the user is notified at step 192. On the other hand, if the pump is available, the point-of-sale system proceeds to step 194 where it initiates a countdown timer. This countdown timer effectively enables the pump for use, provided such use is initiated within a predetermined amount of time. Upon initiating the countdown timer, the point-of-sale system issues a message to the mobile app server, which relays the message to the mobile app, causing the mobile app to concurrently begin a countdown timer at step 196. Although both the point-of-sale system 32 and the mobile app 31 are performing a countdown, the respective countdown clocks are not necessarily in lockstep synchronism. Rather, the countdown timer on the mobile app is configured to expire after a time slightly less than the countdown timer of the point-of-sale system will expire. The countdown timer on the mobile app displays a numeric countdown, preferably in seconds, and serves merely to give the user a close approximation of how much time he or she has to begin fueling. If the countdown time on the point-of-sale system expires, the authorized pump operation is aborted and will need to be resumed, beginning at step 174, if desired.

The actual fueling begins when the user lifts the pump handle and selects the fuel grade as illustrated at step 198. This operation is performed at the dispensing pump itself and is communicated to the point-of-sale system 32. Once fueling has begun, the point-of-sale system issues a message to the mobile app server which then relays the message to the mobile app notifying the user that fueling has started at step 199.

Figure 9:
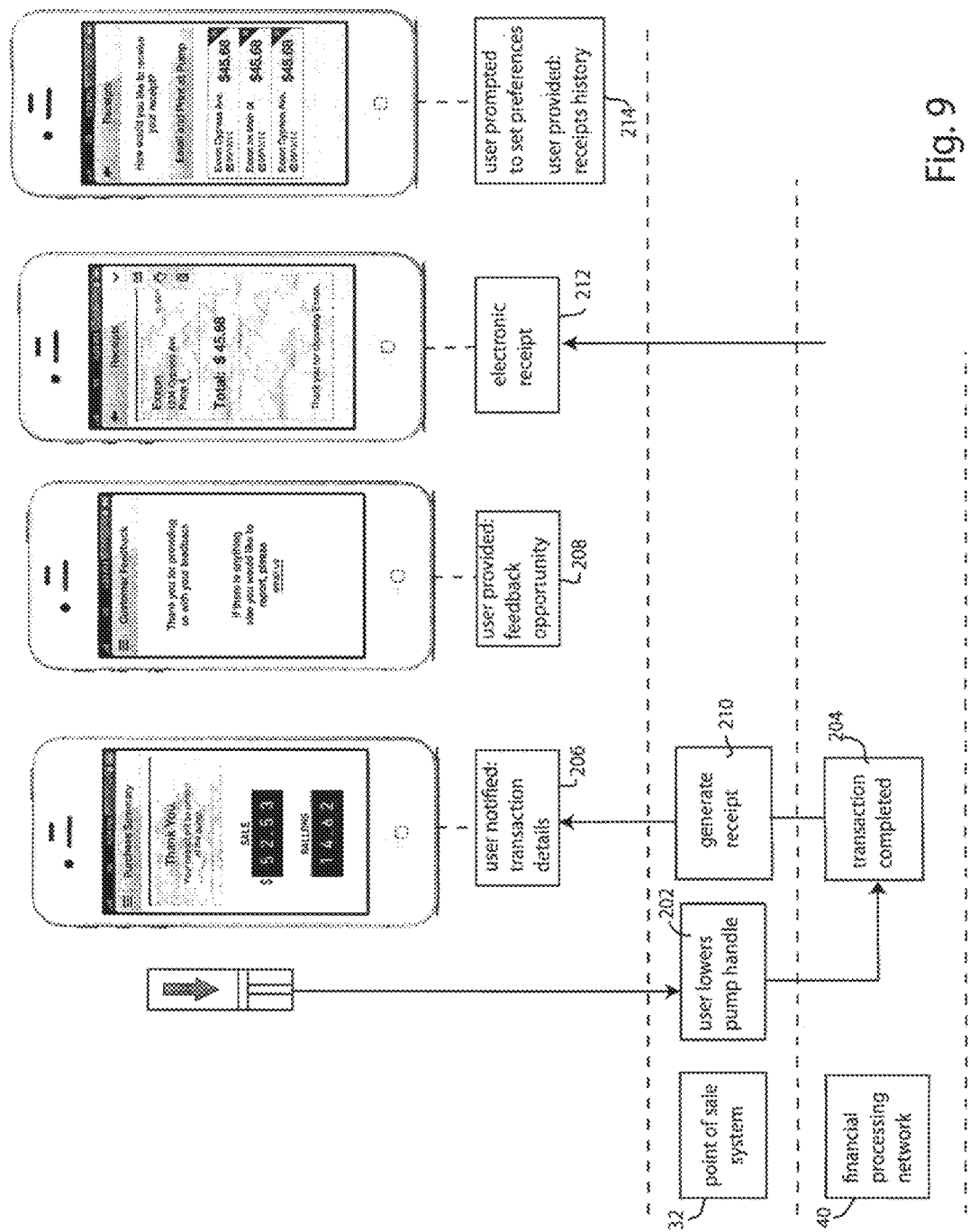
FIG. 9 illustrates exemplary mobile device user interface screens and the associated operation of components of the fuel dispensing system in completing the fuel dispensing and issuing the transaction details and receipt to the user.

As shown in FIG. 9, once fueling is complete, the user lowers the pump handle at step 202 or otherwise operates the dispensing pump to indicate fueling is terminated. The point-of-sale system generates a receipt as at step 201 and further sends a message to the financial processing network that the transaction is completed. The financial processing network, at step 204, closes out the transaction record, debits the user's account, and either the point of sale system 32, acting through the site connector computer 42 or the financial processing network 40 sends a message to the mobile app server, which is relayed to the mobile app, notifying the user of the transaction details at step 206. As illustrated in FIG. 9, these details may be represented graphically on the mobile device display to resemble the same information typically seen on the dispensing pump.

After completing the purchase, if desired, the user can select through the main startup screen 174 to provide customer feedback, whereupon the mobile app presents a screen prompting the user for feedback, as at step 208. The feedback opportunity is conveniently provided at this point because the rest of the system may be momentarily busy generating a printed receipt. In the example depicted in FIG. 9, the user preference that the user prefers an electronic receipt. This is signaled by the mobile app server, based on user preferences stored in the mobile app database. Thus, the financial processing network generates a receipt at 210, forwards that receipt to the mobile app server at 212 for forwarding on to the mobile app for display on the user's mobile device. In this example, the user had previously stated a preference for electronic receipts. The user can change this preference by accessing the settings choice from the main startup screen 174. When this is done the mobile app presents the user, as depicted at step 214, a renewed opportunity to set preferences. If the user selects the active area entitled "how would you like to receive your receipt?", a dropdown list is provided allowing the user to make a selection of his or her choice and that selection is then saved in the user preferences within the mobile app server. The screen displayed at step 214 also displays a history of previous receipts. Each entry in the history log can be selected by touching the entry, and this takes the user to another screen where details of that transaction can be reviewed.

Figure 10:
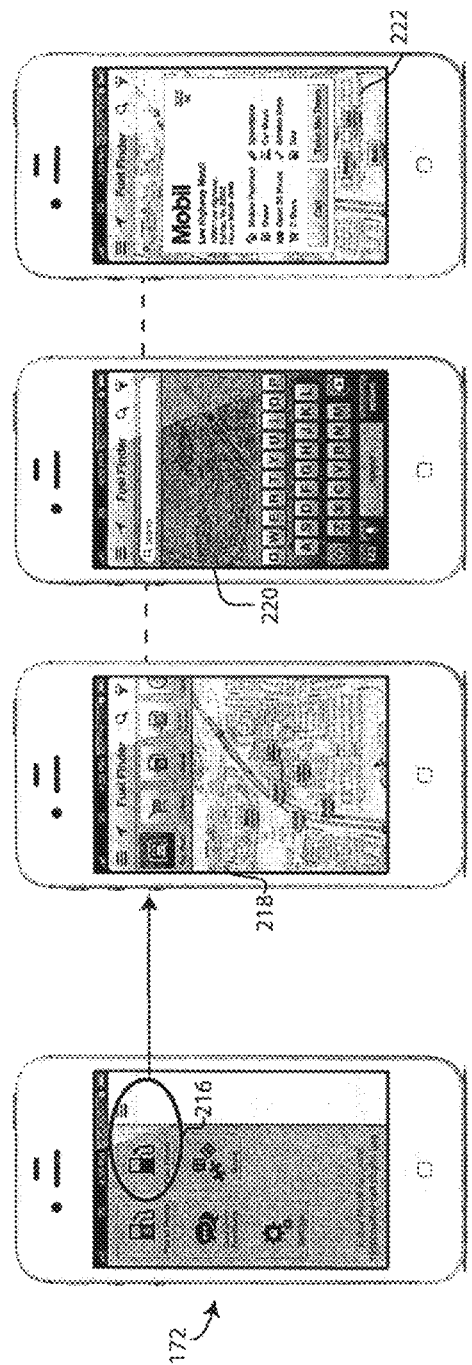
FIG. 10 depicts exemplary mobile device user interface screens involved in the "fuel finder" function whereby the user is given directions to a particular fuel dispensing site.

If desired, the mobile app 31 can also perform useful functions. Some of these will now be described in connection with FIGS. 10, 11 and 12. Referring first to FIG. 10, the user can select "fuel finder" from the main start screen 172, as indicated at step 216. This takes the user to a sequence of screens 218, 220, and 222 where the user can enter specific products or services he or she is looking for (step 218), or enter a specific dispensing site location or name (step 220) and then be shown an information screen with pertinent information about that site, with the option to either place a telephone call to that site or receive directions (step 222).

Figure 11:
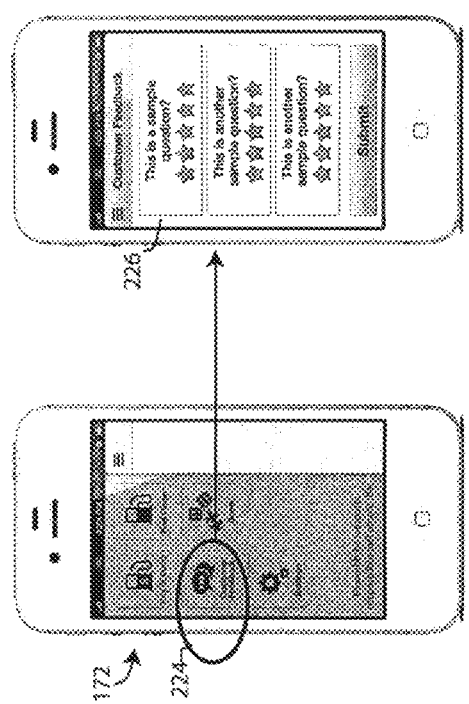
FIG. 11 depicts exemplary mobile device user interface screens involved in the function of obtaining user feedback.
Figure 12:
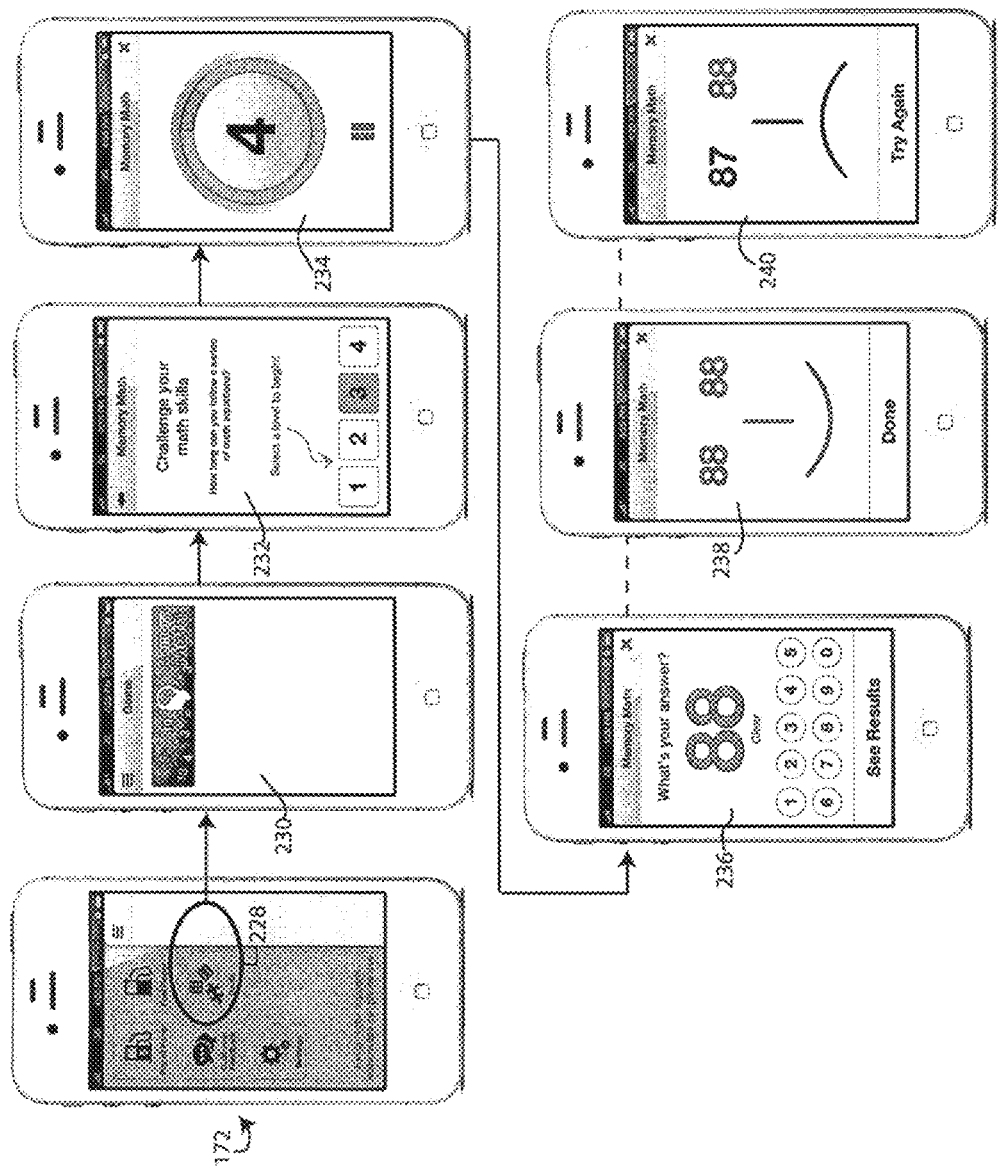
FIG. 12 depicts exemplary mobile device user interface screens for an exemplary game, offered as an option to the user while fueling is taking place.

The main start screen 172 can also be used to provide customer feedback, as depicted in FIG. 11. This is done by selecting "customer feedback" from the main start screen at step 224. Doing so takes the user to a feedback screen depicted at 226. Feedback entered through this mechanism is then conveyed back to the mobile app server for storage referenced to the user ID.

To offer the user an enjoyable pastime while fueling is underway, the mobile app also supports games that may be played on the mobile device. An example of such a game has been illustrated in FIG. 12. The user selects "games" from the main start screen 172 at step 228. The mobile app then displays a list of games as at 230. In this instance, a single game is illustrated; however, it will be understood that multiple games may be offered at this point. By selecting the game at 230, the user then proceeds to interact with the game as depicted at steps 232-240. If desired, the state of the game can be saved as part of the user preferences in the mobile app server, thereby allowing the user to resume a game previously initiated. If desired, loyalty points may be awarded as a reward for playing the game. Such loyalty points may be redeemed to provide discounts on subsequent purchases or other features.

Figure 13:
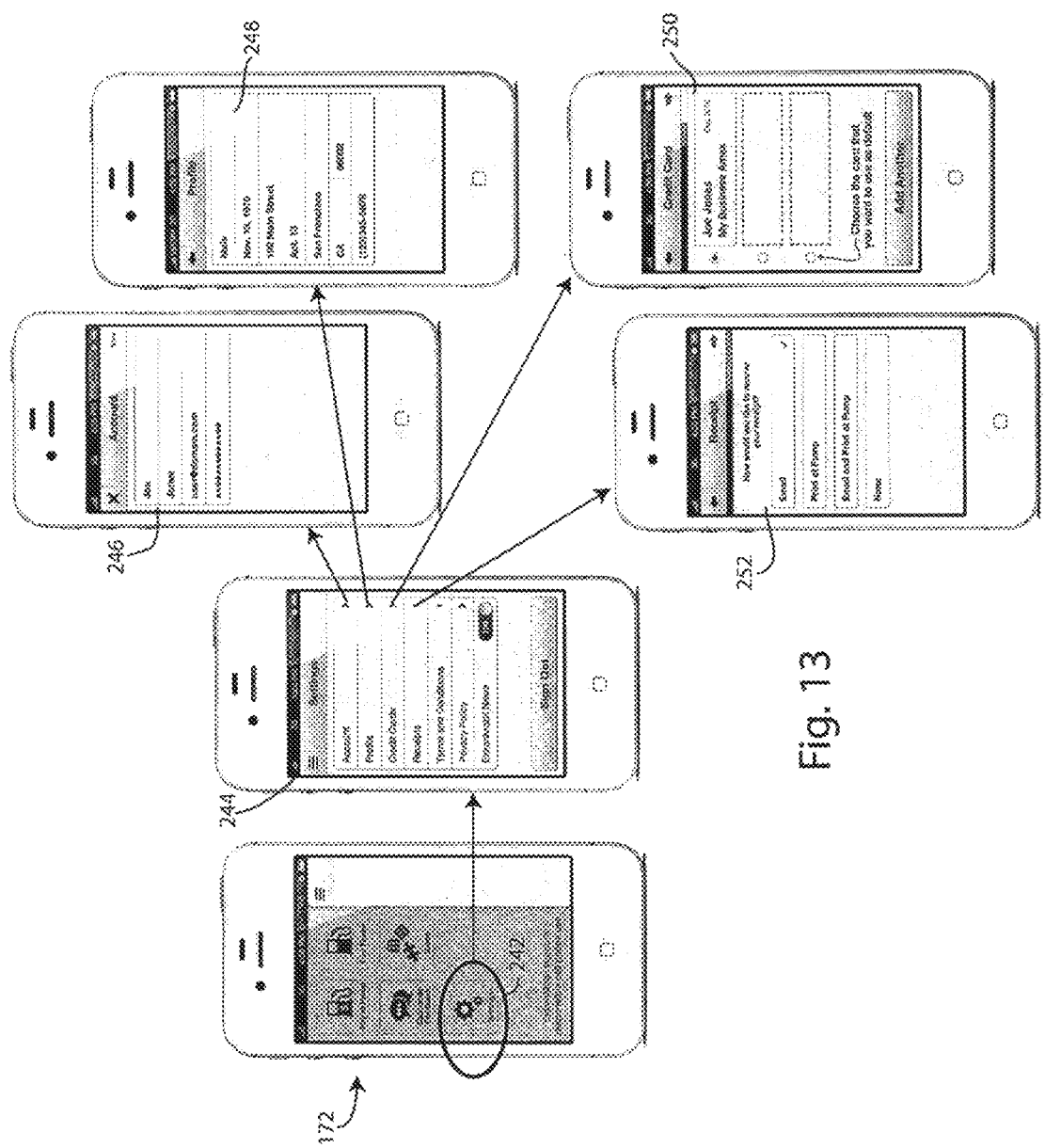
FIG. 13 depicts exemplary mobile device user interface screens whereby various device settings, user account and credit card information, user profiles and receipt preferences are communicated to the mobile app server.

As illustrated in FIG. 13, the main start screen 172 also provides a convenient point for the user to adjust program settings. By selecting the "settings" icon at step 242, the user is presented with a setting screen as at 244. The user then simply selects one of the offered choices in the settings screen and may then enter information or make changes as depicted at 246-252.

With reference to FIG. 5, it will be recalled that the principal communication between the mobile app layer and the mobile app server layer comprises very minimal information, mainly user ID, latitude-longitude and pump number. Thus, during normal use, very little information is communicated on the non-secure side of the computer implemented fuel dispensing system. One exception, however, is initial signup.

Figure 14:
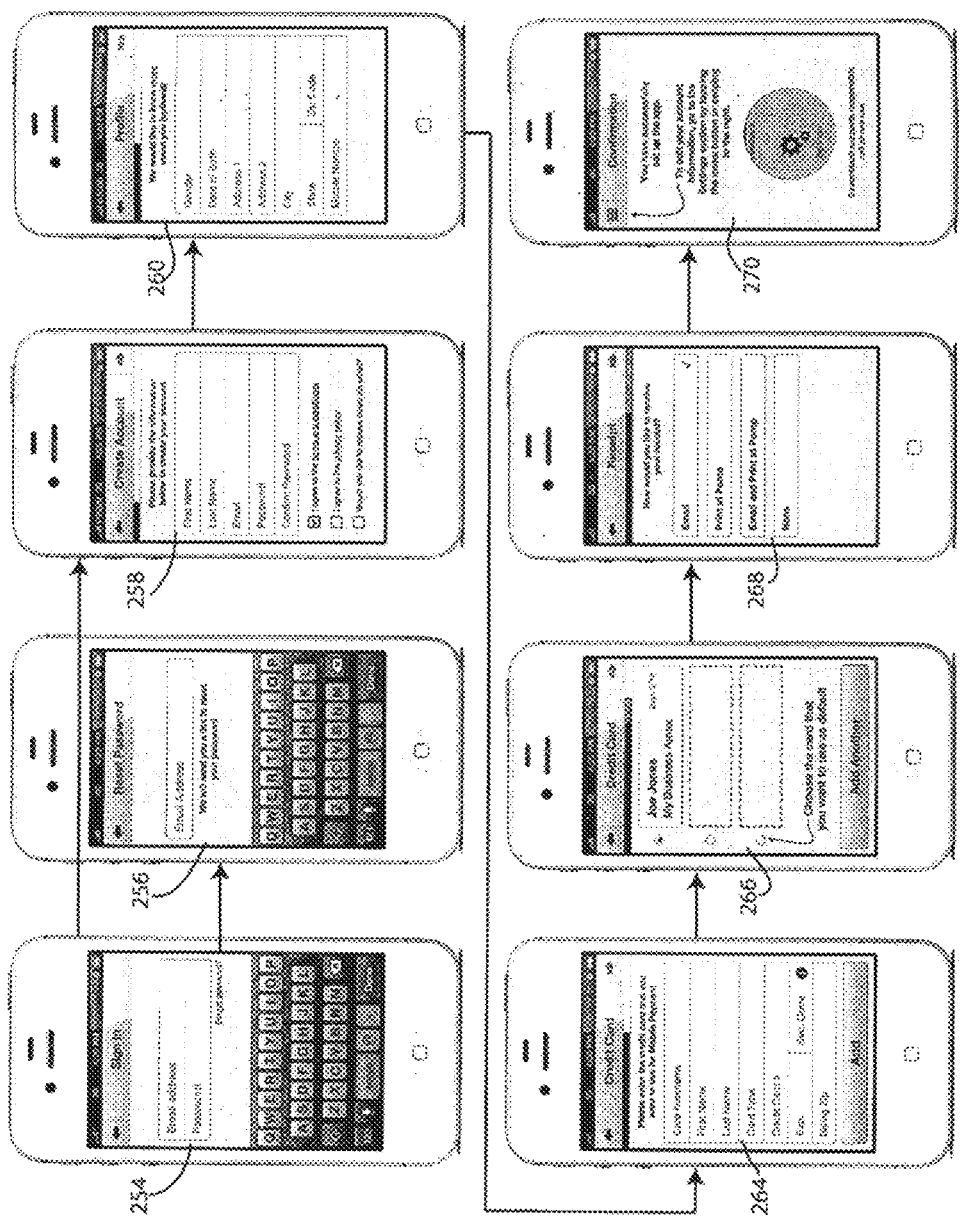
FIG. 14 depicts exemplary mobile device user interface screens involved in the initial signup process, and/or subsequent modification of previously entered parameters

Depicted in FIG. 14, the initial signup procedure does involve providing details of the user identify and the user's credit card number. Although the mobile device 30 and mobile app 31 are on the potentially non-secure side of the system, communication between the mobile app and the mobile app server is performed using an encrypted https protocol. Thus, the information conveyed in steps 254-270 of FIG. 14 are all sent using this https communication standard.

At step 254, the user provides an email address and password. If the user is unable to remember his or her password, the "forgot password" is chosen, taking the user to the screen depicted at 256 where the option to reset and create a new password is offered. If the user successfully enters his or her email address and password, the mobile app then presents a "create account" screen as at 258. At this screen the user provides basic personal information as well as assigned a password for the account to be created. Once the terms and conditions have been accepted, the user is then presented with the profile screen as at 260. In this screen, the user can supply additional optional information.

Next, at 264, the user is requested to enter credit card information. If the user wishes to have additional credit cards tied to the account, he or she can add them at step 266.

Next, at step 268, the user is requested to set a preference for how receipts shall be delivered. Exemplary options include: email, print at pump, email and print at pump, and none.

Finally, once the account has been created, the user is given a confirmation screen as at 270.

Ordinarily, the signup process need only be performed once. Thereafter, when the user wishes to use the mobile device to purchase and dispense fuel, all that is required is to sign in with email address and password (as at step 254). After sign-in, the user is presented with the main start screen 172. At the user's option, the mobile app can be configured so that initial sign-in (step 254) is bypassed once the account has been created. If bypassed, the user is presented with the main start screen 172 (FIG. 6) immediately upon launching the mobile app. Users who independently lock their mobile device with a passcode may prefer to bypass the sign-in option, as access to the mobile app is blocked by the device passcode.

Having thus given an overview of the computer-implemented fuel dispensing system and the manner by which a user interacts with that system, a more detailed discussion of key components will now be provided. FIG. 15 depicts the database schema of the mobile app database at 282. As illustrated, the schema involves several tables including a site table 282, a pumps table 284, a site features table 286, and receipts table 288 and a user table 290. The site table 282 has a site ID field that serves as the index field whereby the pumps table 284, the site features table 286 and the receipts table 288 are referenced. There is many-to-one relation between the pumps table and the sites table, accounting for the fact that a simple site may have many pumps. There is one-to-many relation between the site table and the site features table, allowing the database structure to be readily expanded to add other features as they become available. In this regard, the site features table would include a feature ID, which would in turn point to another table (not shown) where the specific details of each feature are stored. In this regard, it will be appreciated that such features as car wash, food, repair and towing might each have different attributes, thus being reflected by different customized tables within the schema.

There is also a one-to-many relation between the site table and the receipts table. The receipts table includes the additional user ID field that serves as a key to reference the user table 290. As illustrated, there is a many-to-one relationship between receipts table 288 and user table 290.

As previously discussed, a principal use of the mobile app database is to decode latitude-longitude information so that the mobile app server can make queries to the site database via the site connector computer 42. This use is reflected in table 282, where a latitude-longitude (LAT-LON) is recorded for each site ID. The site ID, in turn, uses the same format as the site ID 72 of FIG. 2 (i.e., the site database). Thus, the mobile app server can readily convert latitude-longitude location coordinates into a site ID that can then be directly used to query the site database. If desired, the mobile app server can store pump identifying information, such as the number of pay points, as well as whether the particular site POS is live in the site table 282. Storage of this information in the mobile app server is optional, as the "truth" regarding number of pay points and the present live state of the point-of-sale system are stored in the site database 44 administered by the site connector computer 42. Nevertheless, this information can be buffered in the mobile app server, allowing it to be accessed multiple times by the mobile device without the need to re-initiate a query to the site database. Use of these buffered values may be mediated by a time-out function so that fresh values are obtained from the site connector computer each time the user visits the dispensing site. Buffered values would be used, for example, where the user receives a "pump has not been authorized" message (illustrated in FIG. 8 at step 192) and thus needs to make another pump selection.

FIG. 16 depicts one embodiment of a mobile app server. In this illustrated embodiment the mobile app server has been implemented using a single processor 302 that is programmed to implement all of the illustrated components of the server, including the components supporting an https interface to communicate with the mobile app 31 and also the components to implement the mobile app database 52. Of course these components can also be implemented using separate processors (separate computers) if desired.

The processor 302 has associated memory that stores an operating system, such as a UNIX operating system 304. Of course other operating system platforms may be used instead. The operating system includes functionality to create a private network 306. The specific choice of protocol for the private network is made based on the system security requirements and based on what existing protocols may be in use to support the conventional credit card/debit card payment system. Thus for illustration purposes two alternative private network protocols have been illustrated: ATM and TLS. Other protocols are also envisioned.

Also stored in memory associated with processor 302 is the program code to implement the server stack, shown at 308. There are many choices for implementing the server stack. For illustration purposes here the server stack has been implemented using Apache web server software, a PHP interpreter used to implement the transaction management logic 310 of the mobile app server 50, and a MySQL software database management system software used to implement the operative functionality of the mobile app database 312. Apache, PHP and MySQL are available as open source components obtainable via the Internet. Of course, the choice of an Apache, PHP and MySQL server stack is intended merely as one example. There are other possible choices for these components. In addition, while interpreted code (PHP) has been illustrated to implement the transaction management logic, compiled code (e.g., C++) may alternatively be used.

As illustrated the mobile app server is configured to communicate over the public Internet using the https protocol, which is a secure protocol. Thus communication with the mobile app 31 on the mobile device uses this https protocol. Other protocols may alternatively be used. Communication with the other components of the computer-implemented fuel dispensing system is preferably effected using a dedicated protocol used specially for the secure-side components of the system. The ATM protocol may be used, for example, where existing infrastructure exists to support dedicated private networked communication. In such an embodiment the physical communication among secure-side components would be carried by landlines or by satellite. If pubic network links are employed, an alternate secure protocol such as the TLS protocol, or other comparable secure protocols, may be used.

FIG. 17 depicts one embodiment of the site connector computer 42. As with the mobile app server, the illustrated embodiment has been implemented using a single processor 314 that is programmed to implement all of the illustrated components of the site connector computer, including the components supporting secure communication with the above site transaction integrator 62 and with the point-of-sale systems 32, and also including the components to implement the site database 44. Of course these components can also be implemented using separate processors (separate computers) if desired.

The processor 314 has associated memory that stores an operating system, such as a UNIX operating system 316. Of course other operating system platforms may be used instead. The operating system includes functionality to create a private network 318. The specific choice of protocol for the private network is made based on the system security requirements and based on what existing protocols may be in use to support the conventional credit card/debit card payment system. Thus for illustration purposes two alternative private network protocols have been illustrated: ATM and TLS. Other protocols are also envisioned.

Also stored in memory associated with processor 314 is the program code to implement the server stack, shown at 320. There are many choices for implementing the server stack. For illustration purposes here the server stack has been implemented using a PHP interpreter used to implement the transaction management logic 322 of the site connector computer 42, and a MySQL software database management system software used to implement the operative functionality of the site database 324. Of course, the choice of a PHP and MySQL server stack is intended merely as one example. There are other possible choices for these components. In addition, while interpreted code (PHP) has been illustrated to implement the transaction management logic, compiled code (e.g., C++) may alternatively be used.

FIG. 18 depicts one embodiment of the above site transaction integrator. As with the mobile app server and site connector computer the illustrated embodiment has been implemented using a single processor 326 that is programmed to implement all of the illustrated components of the above site transaction integrator, including the components supporting secure communication with the mobile app server 50, the site connector computer 42 and the financial processing network 40. Of course these components can also be implemented using separate processors (separate computers) if desired.

The processor 326 has associated memory that stores an operating system, such as a UNIX operating system 328. Of course other operating system platforms may be used instead. The operating system includes functionality to create a private network 330. The specific choice of protocol for the private network is made based on the system security requirements and based on what existing protocols may be in use to support the conventional credit card/debit card payment system. Thus for illustration purposes two alternative private network protocols have been illustrated: ATM and TLS. Other protocols are also envisioned.

Also stored in memory associated with processor 326 is the program code to implement the server stack, shown at 332. There are many choices for implementing the server stack, such as those described in connection with the mobile app server 50 and the site connector computer 42.

While FIGS. 16, 17 and 18 have for explanation purposes depicted specific, discrete computer-processor embodiments of the mobile app server 50, the site connector computer 42 and the above site transaction integrator 62, these devices may be implemented using cloud-based server components, such as are available as part of the Amazon Cloud Services, available from Amazon.com.

Figure 19:
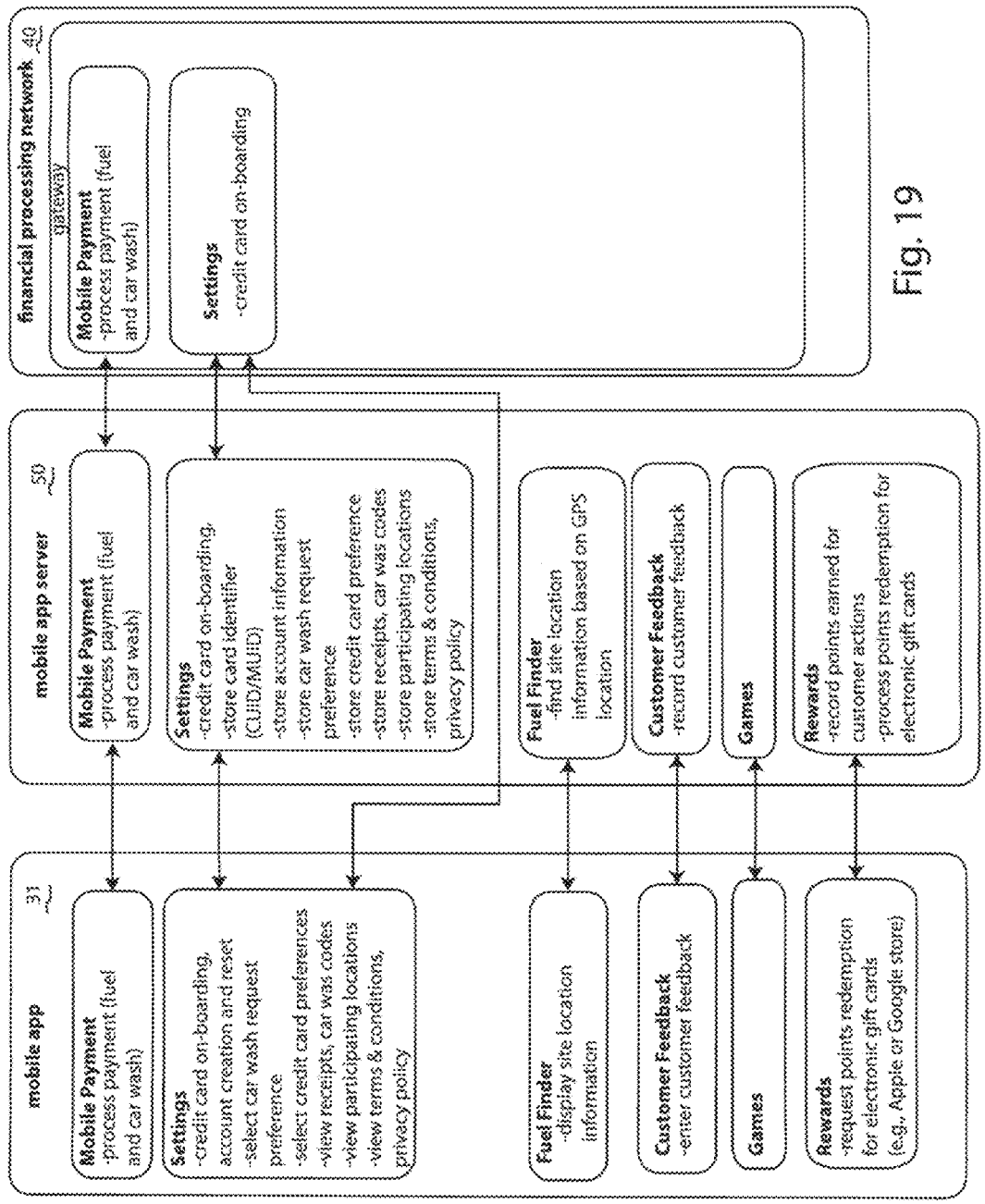
FIG. 19 is an interface diagram showing the functions and interfaces by which the mobile app, mobile app server and financial processing network communicate.
Figure 20:
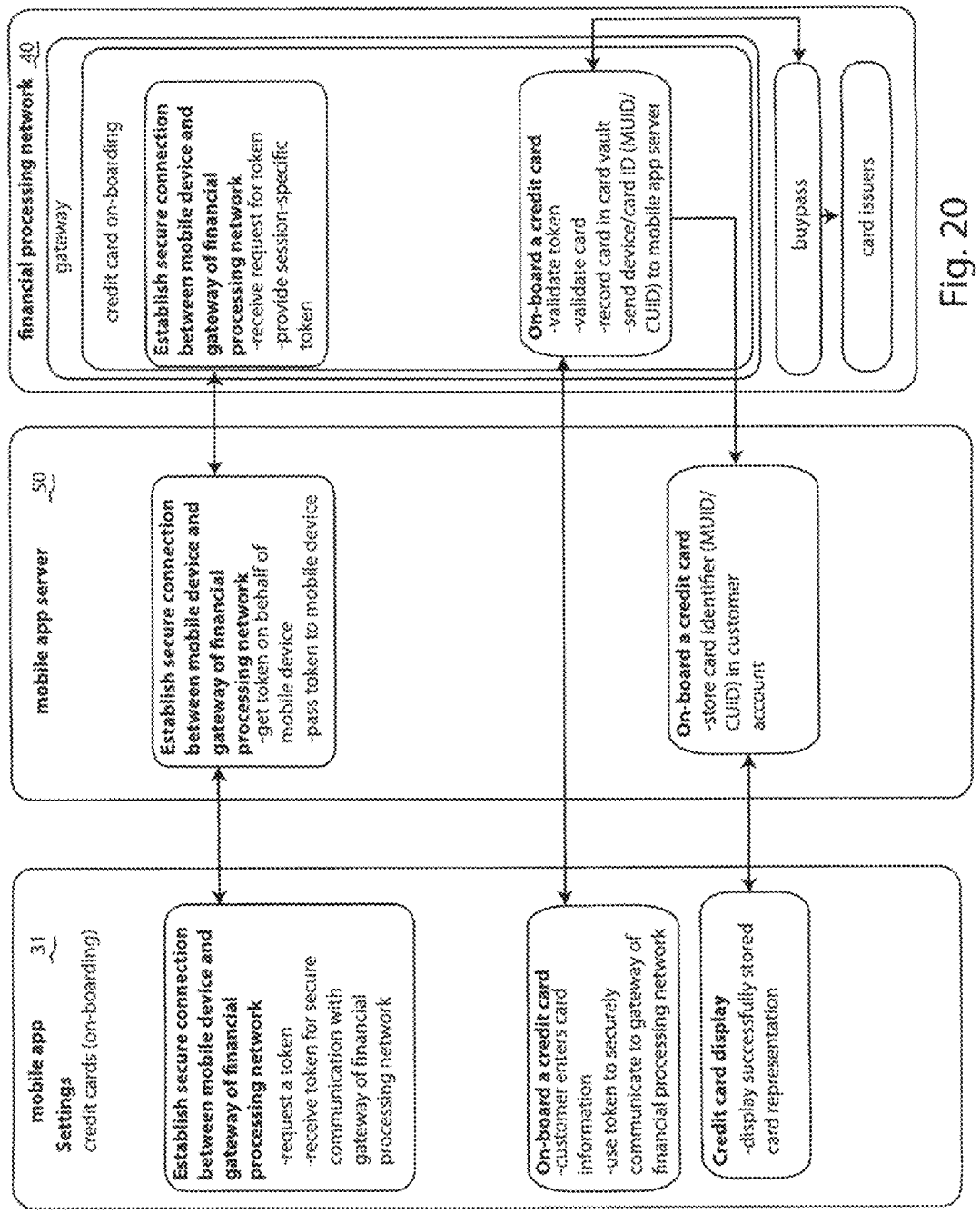
FIG. 20 is an interface diagram showing the credit card on-boarding process.

Referring now to FIGS. 19, 20 and 21, additional discussion of how the mobile app 41, mobile app server 50 and financial processing network 40 interact. Specifically, FIG. 19 illustrates how various functions within these three components share responsibility for effecting: mobile payment, maintaining settings, performing the fuel finder operation, harvesting customer feedback, supporting game interaction and providing customer rewards. As seen, the mobile app server interacts with the financial processing network through a "gateway" which may be implemented as a computer, server or router within the financial processing network 40 or within the above site transaction integrator 62 (FIG. 1).

FIG. 20 shows the process by which a customer first configures the system to accept a particular credit card. The process, called "on-boarding" involves establishing a secure connection between the mobile device 30 and the gateway of the financial processing network 40. To effect this secure connection the mobile app server effectively "introduces" the mobile app to the gateway of the financial processing network and then allows the mobile app and financial processing network to join together in a secure exchange to which the mobile app server is not a party. This secure connection thus allows credit card information to be sent directly from the mobile device to the financial processing network. A system within the financial processing network issues a "token" to represent the customer's credit card and that token is passed back to the mobile device. Once this initial "on-boarding" process is complete, the mobile device does not need to send credit card information, but instead sends the token. In this way the customer's credit card information does not need to be sent every time a purchase is made. A suitable technology for implementing this token functionality may be obtained from First Data Corporation under the designation TransArmor®.

FIG. 21 shows the process by which a mobile payment is made through the shared responsibilities of the mobile app, the mobile app server and the financial processing network. In FIG. 21, the site location information database corresponds to the functionality provided by the mobile app database 52 (FIG. 1) and has thus been given a like reference numeral designation. The site payment information database corresponds to the functionality provided by the site database 44 (FIG. 1) and has thus been given a like reference numeral.

To simplify illustration of the message flow, database 44 has been shown as being within the "mobile payment" function provided by the financial processing network. Likewise the site connector computer 42 has been shown as within the domain of the financial processing network. While it is possible to deploy and operate the site connector computer 42 and its associated site database 44 as components of the financial processing network 40, as suggested by the placement of computer 42 and database 44 in FIG. 21, a separate configuration, as shown in FIG. 1 is also possible.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented fuel dispensing system to facilitate use of a mobile device to purchase and dispense fuel from a dispensing site having an electronic point-of-sale system that mediates operation of at least one fuel dispensing pump using funds administered by a financial processing computer network, comprising:

a site connector computer programmed to administer a site database and to provide a site connector interface adapted to be coupled securely to the point-of-sale system of at least one site each of a plurality of geographically disparate dispensing sites;

the site connector computer being programmed to define in said site database a data structure that stores site-specific information about the dispensing sites including the site location and pump identifying information from which the number of pumps at each dispensing site may be ascertained;

the site connector computer being programmed to communicate with the electronic point-of-sale system and populate a record in said site database according to said data structure using information obtained from said at least one site dispensing sites; and a mobile app server computer programmed to support Internet communication with the mobile device and also to communicate securely with the financial processing computer network;

the mobile app server computer being further programmed to communicate with the site connector computer to thereby communicate queries to and receive information from the site database;

the mobile app server computer being further programmed to ascertain a site location from the mobile device upon user interaction via the mobile device and to use said site location to issue a query to the site database to acquire the pump identifying information from the site database;

the mobile app server computer being further programmed to communicate the pump identifying information to the mobile device for use in making a pump selection based on the pump identifying information;

the mobile app server computer being further programmed to receive from the mobile device a pump selection identifier and to issue a fuel purchase instruction that includes the pump selection identifier to the financial processing computer network.

2. The system of claim 1 wherein the site connector computer communicates with the point-of-sale system of at least one site independent of the mobile app server and the mobile app server receiving information from the site database.

3. The system of claim 1 wherein the site connector computer is programmed to pull said site-specific information from the electronic point-of-sale system.

4. The system of claim 1 further comprising an electronic point-of-sale system that pushes said site-specific information to the site connector computer.

5. The system of claim 1 wherein the site connector computer is programmed to define in said site database a data structure that stores site-specific information about the dispensing site selected from the group consisting of site IP address, operational status of the point-of-sale system, operational status of pumps, identity of products and services other than fuel being offered at the site, and indication of the site's participation in promotional programs.

6. The system of claim 1 wherein user preferences are stored in a mobile app database.

7. The system of claim 1 further comprising an electronic point-of-sale system that supports at least one of: financial tenders, credit card transactions, debit card transactions and ACH funds transfers and wherein the site connector is coupled to the electronic point-of-sale system and programmed to forward credit card transaction information to the financial processing network.

8. The system of claim 1 further comprising a financial processing network computer that is programmed to issue first pump authorization information to the site connector computer and the site connector computer is further programmed to issue second pump authorization information to the electronic point-of-sale system in response to receipt of said first pump authorization information.

9. The system of claim 1 further comprising a mobile device programmed with a mobile payment app that generates a display of plural individual pump designators based on the pump identifying information.

10. The system of claim 1 wherein the site connector computer is programmed to pull said site-specific information from the electronic point-of-sale system before performing a financial transaction.

* * * * *